US007424456B2

(12) United States Patent
Takahashi et al.

(10) Patent No.: US 7,424,456 B2
(45) Date of Patent: Sep. 9, 2008

(54) SERVICE PROVISION SUPPORT SYSTEM, BUNDLE MANAGEMENT TERMINAL, TERMINAL PROGRAM, BUNDLE DATA STRUCTURE, SERVICE PROVISION SUPPORT METHOD, AND BUNDLE GENERATION METHOD

(75) Inventors: Toru Takahashi, Chino (JP); Shinya Taniguchi, Suwa (JP); Akihito Fukao, Suwa (JP); Senichi Mokuya, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 1289 days.

(21) Appl. No.: 10/390,005

(22) Filed: Mar. 18, 2003

(65) Prior Publication Data

US 2005/0071267 A1 Mar. 31, 2005

(30) Foreign Application Priority Data

Mar. 27, 2002 (JP) ............................. 2002-089813

(51) Int. Cl.
  *G06Q 40/00* (2006.01)
(52) U.S. Cl. .......................................... 705/39; 705/40
(58) Field of Classification Search ............. 705/10–44; 340/5.5, 5.9, 825.29
  See application file for complete search history.

(56) References Cited

U.S. PATENT DOCUMENTS 5,343,529 A * 8/1994 Goldfine et al. ............... 705/75
6,029,150 A * 2/2000 Kravitz ......................... 705/39
6,275,988 B1 * 8/2001 Nagashima et al. ............ 725/8

FOREIGN PATENT DOCUMENTS

| JP | A 11-184709 | 7/1999 |
| JP | A 2001-312660 | 11/2001 |
| JP | A 2001-347729 | 12/2001 |

* cited by examiner

Primary Examiner—Frantzy Poinvil
(74) Attorney, Agent, or Firm—Oliff & Berridge, PLC

(57) ABSTRACT

The invention provides a service provision support system that can reduce the economic expenses imposed on a service recipient due to the provision of a service, and that can provide a service for an unspecified, large number of persons. A charge bundle includes: a usage status detection process, to detect the usage state of a charge bundle compatible device; a charge calculation process, to calculate the usage charge based on the usage status detected during the usage status detection process; and a charge notification process, to notify a charge bundle management server of the usage charge obtained by the charge calculation process. The charge bundle management server generates a charge bundle in accordance with a request received from the service provision terminal, and transmits the generated charge bundle to the charge bundle compatible device. Further, the charge bundle management server performs the charge process to charge the service provider the usage charge acquired during the charge notification process. When the charge bundle compatible device receives the charge bundle, it constitutes the usage status detection process, the charge calculation process, and the charge notification process based on the received charge bundle.

14 Claims, 16 Drawing Sheets

US 7,424,456 B2

SERVICE PROVISION SUPPORT SYSTEM, BUNDLE MANAGEMENT TERMINAL, TERMINAL PROGRAM, BUNDLE DATA STRUCTURE, SERVICE PROVISION SUPPORT METHOD, AND BUNDLE GENERATION METHOD

BACKGROUND OF THE INVENTION

1. Field of Invention

The present invention relates to a system, a terminal, a program, a data structure, and a method, to charge a service provider a charge that is generated on the service reception terminal side through the provision of a service. In particular, the present invention relates to an appropriate service provision support system, a bundle management terminal, a terminal program, a bundle data structure, a service provision support method, and a bundle generation method, that can reduce the economic expenses imposed on the recipient of a service that arises due to the provision of the service, and that can provide a service for an unspecified, large number of people, thereby enabling the service provision to be smoothly performed.

2. Description of Related Art

In the related art, in order to facilitate a transaction by using a service across a network, points having a monetary value (e.g., electronic cash or a note) are purchased in advance using a credit card. A user who is authenticated across a network can purchase a product using these points. As a specific example, the related art includes a technique referred to as a QQQ card. The QQQ card is described in detail at the homepage designated by the URL (Universal Resource Locator) "http://www.qqq.or.jp/qqqcard/index.html". (It should be noted, however, that the above contents of the homepage are those before the present application was filed.)

Further, also by using ".NET My Service" and "NET Passport" (Trademarks of Microsoft) produced by Microsoft Corp., which have drawn people's attention, so long as the authentication across the network is completed, products can be purchased by using a wallet referred to as a ".NET Wallet", without the credit card number having to be reentered. As a specific example, the details thereof are shown at the home pages designated by URLs "http://www.microsoft.com/japan/presspass/releases/121_701nett.htm" and "http://www.atmarkit.co.jp/fdotnet/insiderseye/20011220devcon.html".

The wallet is implemented by a system referred to as a server wallet. The server wallet is a system whereby a server manages credit data and money data in order to pay charges to electronic shops on the Internet. For a network electronic money system, such as SET or Millicent, which is the standard for credit transactions, a user must install the wallet software in a computer in advance. The wallet software stores credit card data used for transactions or money data indicating the money withdrawn from an actual bank account. In order to purchase a product, deposit data is transmitted to the system of an electronic shop, and the stored money data is reduced or the user accesses the system of a credit company to ask for a transaction. In the server wallet, the function, corresponding to the wallet software application, is implemented by the server to enable the unified management of transaction data.

SUMMARY OF THE INVENTION

Not only services to sell products as in the related art technique described above, but also advertisement distribution services to distribute advertisements, can be provided using the network. Since the feature of the latter service differs from that of the former service and is actively provided by a service provider, when a service to distribute an advertisement by fax is received, the service recipient must pay the communication charge and the paper charge incurred by the reception of a fax. This also applies to an email distribution service for which a cellular phone is used, and a user of a cellular phone must pay the communication charge incurred by the reception of email.

Therefore, there are some service recipients who are displeased with the conditions under which a service is provided and may refuse a transmission, making it difficult for a service provider to smoothly provide a service. Thus, in order a service to be smoothly provided, it is preferable that a service provider who profits from the distribution of an advertisement assume the economic expenses imposed by the provision of the service.

However, since related art techniques for the provision of a service are so designed that a recipient (e.g., the purchaser of a product) electronically pays a service provider a price (points) consonant with the range of the received service, it is difficult for a provider of an above described service to actively provide the service and electronically pay a service recipient a price consonant with the range of the service provided.

When an operation is implemented by using the related art techniques, the registration of a service recipient is required by an electronic transaction server. However, it is difficult to effect this registration when a service, such as an advertisement distribution service, is to be provided for an unspecified, large number of persons.

To address or resolve the problems of the related art techniques, the present invention provides an appropriate service provision support system, a bundle management terminal, a terminal program, a bundle data structure, a service provision support method, and a bundle generation method, that can reduce the economic expenses imposed on a service recipient as a result of the provision of a service, and that can provide a service for an unspecified, large number of people, so that the provision of a service can be smoothly performed.

To address or achieve the above, according to a first aspect of the invention, a service provision support system is provided which connects together a service provision terminal that provides a service, and a service reception terminal, which is the destination for the service that is provided, and enables the two to communicate with each other, and which distributes to a service provider the economic expenses arising at the service reception terminal due to the provision of the service. The system includes:

an expenses calculation device to calculate the economic expenses arising at the service reception terminal due to the provision of the service; and an expenses distribution device to distribute, to the service provider, a part or all of the economic expenses calculated by the expenses calculation device.

On an occasion to provide the service, the service provision terminal transmits, to the service reception terminal, a bundle that includes the expenses calculation device.

Upon receiving the bundle, the service reception terminal constitutes the expenses calculation device based on the received bundle.

With this configuration, when the service provision terminal provides a service, the bundle including the expenses calculation device is transmitted to the service reception terminal.

Upon receiving the bundle, the service reception terminal builds the expenses calculation device based on the received bundle. Under these conditions, when the service is provided by the service provision terminal, the expenses calculation device calculates the economic expenses arising at the service reception terminal due to the provision of the service.

The expenses distribution device distributes a part or all of the obtained economic expenses to the service provider.

The bundle may be transmitted by the service provision terminal, or by a terminal other than the service provision terminal and the service reception terminal. This also applies for a service provision support system according to a second aspect of the invention.

Further, the expenses distribution device may be provided for the service provision terminal and the service reception terminal, or for a terminal other than the service provision terminal and the service reception terminal. This also applies for the service provision support system according to the second aspect of the invention.

Furthermore, the economic expenses are not limited to one reducible to or convertible into money, but also to one not reducible to or convertible into money, such as the amount of expendable supplies consumed for the provision of the service. This also applies for the service provision support system according to the second invention.

Further, the service provision terminal need only be a communication facility that is connected to one end of a communication path extending to the service reception terminal, and that at least includes a server function. The service provision terminal can also be constituted as a terminal that includes both the client function and the server function. This also applies for a service provision support system according to a third aspect of the invention, a bundle management terminal according to a fourteenth aspect of the invention, a terminal program according to a sixteenth aspect of the invention, a service provision support method according to a twentieth aspect of the invention, and a bundle generation method according to a twenty-second aspect of the invention.

A service provision support system according to the second aspect of the invention, is provided which connects a gateway terminal that, to enable communication, connects a service reception terminal, which is a service provision designation, to a service provision terminal, which is a service provision source, so that the terminals can communicate with each other, and which distributes to a service provider the economic expenses arising at the service reception terminal due to the provision of a service. The system includes:

an expenses calculation device to calculate the economic expenses arising at the service reception terminal due to the provision of the service; and an expenses distribution device to distribute, to the service provider, a part or all of the economic expenses calculated by the expenses calculation device.

On an occasion to provide the service, the service provision terminal transmits to the gateway terminal a bundle including the expenses calculation device.

Upon receiving the bundle, the gateway terminal constitutes the expenses calculation device based on the received bundle.

With this configuration, when the service provision terminal provides a service, a bundle that includes the expenses calculation device is transmitted to the gateway terminal.

Upon receiving the bundle, the gateway terminal constitutes the expenses calculation means based on the received bundle. Under this condition, when the service is provided by the service provision terminal, the expenses calculation device calculates the economic expenses arising at the service reception terminal due to the provision of the service.

The expenses distribution device distributes a part or all of the obtained economic expenses to the service provider.

The service provision terminal need only be a communication facility that is connected to one end of a communication path extending to the gateway terminal, and that has at least a server function. The service provision terminal may also be one having both a client function and a server function. This hereinafter applies for a service provision support system according to a thirteenth aspect of the invention, a bundle management terminal according to fifteenth and seventeenth aspects of the invention, a service provision support method according to a twenty-first aspect of the invention, and a bundle generation method according to a twenty-third aspect of the invention.

Further, a service provision support system according to the third aspect of the invention is provided.

A service provision terminal, which is a service provision source, a service reception terminal, which is a service provision destination, and a bundle management terminal to manage a bundle are connected together so as to enable communication.

The service provision terminal, on an occasion to provide a service, applies the bundle for the service reception terminal.

A service provider is demanded for a charge that arises at the service reception terminal due to the provision of the service. The service provision support system is provided such that the bundle includes:

a usage status detection device to detect the usage status of the service reception terminal, a charge calculation device to employ the usage status detected by the usage status detection device to calculate a charge that arises at the service reception terminal due to the provision of the service, and a charge notification device to transmit to the bundle management terminal a notification of the charge obtained by the charge calculation device.

The bundle management terminal includes:

a bundle generation device to generate the bundle upon receiving a request from the service provision terminal, a bundle transmission device to transmit, to the service reception terminal, the bundle generated by the bundle generation device, and a charge processing device to perform charge processing to charge a part or all of the charge contained in the notification provided by the charge notification device to the service provider.

The service reception terminal, upon receiving the bundle, constitutes the usage status detection device, the charge calculation device, and the charge notification device based on the received bundle.

With this configuration, on an occasion to provide a service, the service provision terminal transmits to the bundle management terminal a request for the application of the bundle.

Upon receiving the request from the service provision terminal, the bundle generation device in the bundle management terminal generates a bundle in accordance with the request, and the bundle transmission device transmits the generated bundle to the service reception terminal.

Upon receiving the bundle, the service reception terminal constitutes the usage status detection device, the charge calculation device, and the charge notification device based on the received bundle.

Under these conditions, when the service provision terminal provides a service, the usage status detection device detects the usage status of the service reception terminal, and the charge calculation device employs the detected usage status to calculate a charge that arises at the service reception terminal due to the provision of the service. Then, the charge notification device notifies the bundle management terminal of the obtained charge.

When the bundle management terminal is notified of the charge by the charge notification device, the charge processing device performs the charge processing to ask the service provider for a part or all of the notified charge.

In this case, the bundle management terminal need only be a communication facility that is connected to the ends of communication paths respectively extended to the service provision terminal and the service reception terminal, and that at least includes a server function. The bundle management terminal may also be provided as a terminal having both the client function and the server function. This hereinafter applies for a bundle management terminal according to a fourteenth aspect of the invention, a terminal program according to a sixteenth aspect of the invention, a bundle data structure according to an eighteenth aspect of the invention, a service provision support method according to a twentieth aspect of the invention, and a bundle generation method according to a twenty-second aspect of the invention.

Furthermore, according to a fourth aspect of the invention, the service provision support system of the third aspect of the invention is provided such that, in accordance with a request received from the service provision terminal, the bundle generation device generates a bundle corresponding to a service provided by the service provision terminal.

With this configuration, in accordance with the request received from the service provision terminal, the bundle generation device generates a bundle corresponding to a service provided by the service provision terminal.

Moreover, according to a fifth aspect of the invention, the service provision support system according to the third or fourth aspects of the invention is provided such that the usage status detection device detects, as the usage status, the number of times, or a period such that, the service provision terminal employs the service reception terminal to provide the service, the amount of expendable supplies consumed by the service reception terminal because of the provision of the service, or the amount of communication occurring at, or the amount of current used by the service reception terminal because of the provision of the service.

With this configuration, the usage status detection device detects, as the usage status, the number of times, or a period such that, the service provision terminal employs the service reception terminal to provide the service, the amount of expendable supplies consumed by the service reception terminal because of the provision of the service, or the amount of communication occurring at, or the amount of current used by, the service reception terminal because of the provision of the service.

In addition, according to a sixth aspect of the invention, the service provision support system according to one of the third to the fifth aspects of the invention is provided such that the bundle management terminal includes a value limit setting device to set a value limit when the service provider is charged for a part or all of the charge included in the notification submitted by the charge notification device; and that, the charge processing charges a part or all of the charge contained in the notification submitted by the charge notification device to the service provider, while employing the value limit set by the value limit setting device as a limit.

With this configuration, when the value limit is set by the value limit setting device, the charge processing device employs the designated value limit as a limit and performs the charge processing to charge a part or all of the charge contained in the notification submitted by the charge notification device to the service provider.

Further, according to a seventh aspect of the invention, the service provision support system according to the sixth aspect of the invention is provided such that the bundle further includes value limit data, indicating the value limit set by the value limit setting device, and a bundle deletion device to delete the bundle; and that, when the charge calculated by the charge calculation device reaches the value limit designated by the value limit data included in the bundle, the bundle deletion device deletes the bundle.

With this configuration, upon receiving the bundle, the service reception terminal employs the bundle to constitute the usage status detection device, the charge calculation device, the charge notification device, and the bundle deleting device. With this configuration, when the calculated charge reaches the value limit designated by the value limit data included in the bundle, the bundle deletion device deletes the bundle.

Furthermore, according to an eighth aspect of the invention, the service provision support system according to one of the third to the sixth aspects of the invention is provided such that a transaction processing terminal that performs a transaction based on the results obtained by the charge processing device is also connected to enable communication; that the transaction processing terminal is connected to a first account management terminal to manage the account of the service provider and to a second account management terminal to manage the account of a service recipient, enabling the terminals to communicate with each other; and that the transaction processing terminal issues a request to the first account management terminal and the second account management terminal that money, equivalent in value to the charge that has arisen at the service reception terminal due to the provision of the service and that should be paid by the service provider, be moved from the account of the service provider to the account of the service recipient.

With this configuration, the transaction processing terminal performs the transaction based on the results obtained by the charge processing device. In the transaction process, a request is forwarded to the first and the second account management terminals for the charge that has arisen at the service reception terminal, which is a result of the provision of the service and which is to be paid by the service provider, be moved from the account of the service provider to the account of the service recipient.

The transaction processing terminal need only be a communication facility that is connected to one end of a communication path extending to the bundle management terminal and that includes, at the least, a server function. The transaction processing terminal may also be a terminal including both the client function and the server function.

According to a ninth aspect of the invention, the service provision support system according to one of the third to the eighth aspects of the invention is provided such that the service provision terminal provides, for the service reception terminal, a fax data distribution service whereby data are distributed by fax; and that the service reception terminal has a fax reception function that can receive data from the service provision terminal by fax.

With this configuration, on an occasion to provide the fax data distribution service, the service provision terminal transmits, to the bundle management terminal, a request for the employment of a bundle.

When the bundle management terminal receives the request from the service provision terminal, the bundle generation means generates a bundle in accordance with the request, and the bundle transmission device transmits the generated bundle to the service reception terminal.

Upon receiving the bundle, the service reception terminal constitutes the usage status detection device, the charge calculation device, and the charge notification device based on the received bundle.

Under these conditions, when the service provision terminal distributes data by fax, the fax reception function receives the distributed data while the usage status detection device detects the fax usage status of the service reception terminal, and the charge calculation device employs the detected fax usage status to calculate a charge that arises at the service reception terminal due to the provision of the fax data distribution service. Thereafter, the charge notification device notifies the bundle management terminal of the obtained charge.

Moreover, according to a tenth aspect of the invention, the service provision support system according to one of the third to the eighth aspects of the invention is provided such that the service provision terminal provides, for the service reception terminal, email and other data distribution services to distribute data by email or by the employment of a specific application; and that the service reception terminal has email and another data reception function that can receive data from the service provision terminal by email or through the specific application.

With this configuration, on an occasion to provide the email or other data distribution service, the service provision terminal transmits, to the bundle management terminal, a request that the bundle management be applied.

When the bundle management terminal receives the request from the service provision terminal, the bundle generation device generates a bundle in accordance with the request, and the bundle transmission device transmits the generated bundle to the service reception terminal.

Upon receiving the bundle, the service reception terminal constitutes the usage status detection device, the charge calculation device, and the charge notification device based on the received bundle.

Under these conditions, when the service provision terminal distributes data by email or by using a specific application, the email or other data reception function receives the distributed data, the usage status detection device detects the email or other data usage status of the service reception terminal, and the charge calculation device employs the detected email or other data usage status to calculate a charge that arises at the service reception terminal due to the provision of the email or other data distribution service. Then, the charge notification device notifies the bundle management terminal of the obtained charge.

According to an eleventh aspect of the invention, the service provision support system according to one of the third to the eighth aspects of the invention is provided such that the service provision terminal provides a video distribution service to distribute video data to the service reception terminal; and that the service reception terminal has a video playback function that can play back the video data received from the service provision terminal.

With this configuration, on an occasion to provide the video distribution service, the service provision terminal transmits, to the bundle management terminal, a request for the employment of a bundle.

When the bundle management terminal receives the request from the service provision terminal, the bundle generation device generates a bundle in accordance with the request, and the bundle transmission device transmits the generated bundle to the service reception terminal.

Upon receiving the bundle, the service reception terminal constitutes the usage status detection device, the charge calculation device, and the charge notification device based on the received bundle.

Under these conditions, when the service provision terminal distributes the video data, the video playback function plays back the distributed video data, the usage status detection device detects the usage status of the service reception terminal, and the charge calculation device employs the detected usage status to calculate a charge that arises at the service reception terminal due to the provision of the video distribution service. Then, the charge notification device notifies the bundle management terminal of the obtained charge.

According to a twelfth aspect of the invention, the service provision support system according to one of the third to eighth aspects of the invention is provided such that the service provision terminal provides an audio distribution service to distribute audio data to the service reception terminal; and that the service reception terminal has an audio playback function that can play back the audio data received from the service provision terminal.

With this configuration, on an occasion to provide the audio distribution service, the service provision terminal transmits, to the bundle management terminal, a request for the employment of a bundle.

When the bundle management terminal receives the request from the service provision terminal, the bundle generation device generates a bundle in accordance with the request, and the bundle transmission device transmits the generated bundle to the service reception terminal.

Upon receiving the bundle, the service reception terminal constitutes the usage status detection device, the charge calculation device, and the charge notification device based on the received bundle.

Under these conditions, when the service provision terminal provides the audio data, the audio playback function plays back the distributed audio data, the usage status detection device detects the usage status of the service reception terminal, and the charge calculation device employs the detected usage status to calculate a charge that arises due to the provision at the service reception terminal of the audio distribution service. Then, the charge notification device transmits the obtained charge to the bundle management terminal.

A service provision support system according to a thirteenth aspect of the invention is provided.

A gateway terminal to connect a service reception terminal, which is a service provision destination to enable communication, a service provision terminal, which is a service provision source, and a bundle management terminal, which is provided for the management of a bundle, are connected together so that they can communicate with each other.

The service provision terminal applies the bundle to the gateway terminal on the occasion for providing a service.

A service provider is demanded for a charge that arises at the service reception terminal due to the provision of the service. The service provision support system is provided such that the bundle includes:

a usage status detection device to detect a usage status of the service reception terminal, a charge calculation device to employ the usage status detected by the usage status detection device to calculate a charge that arises at the service reception terminal due to the provision of the service, and a charge notification device to transmit to the bundle management terminal a notification of the charge obtained by the charge calculation device.

The bundle management terminal includes:

a bundle generation device to generate the bundle upon receiving a request from the service provision terminal, a bundle transmission device to transmit, to the gateway terminal, the bundle generated by the bundle generation device, and a charge processing device to perform charge processing to charge a part or all of the charge contained in the notification provided by the charge notification device to the service provider.

The gateway terminal, upon receiving the bundle, constitutes the usage status detection device, the charge calculation device, and the charge notification device based on the received bundle.

With this configuration, on an occasion to provide the service, the service provision terminal transmits to the bundle management terminal a request that a bundle be employed.

When the bundle management terminal receives the request from the service provision terminal, the bundle generation device generates a bundle in accordance with the request, and the bundle transmission device transmits the generated bundle to the gateway terminal.

Upon receiving the bundle, the gateway terminal constructs the usage status detection device, the charge calculation device, and the charge notification device based on the received bundle. Under these conditions, when the service provision terminal provides a service, the usage status detection device detects the usage status of the service reception terminal, and the charge calculation device employs the detected usage status to calculate a charge that arises at the service reception terminal due to the provision of the service. Then, the charge notification device notifies the bundle management terminal of the obtained charge.

When the bundle management terminal is notified of the charge by the charge notification device, the charge processing device performs the charge processing to charge a part or all of the charge that is reported to the service provider.

In this case, the bundle management terminal need only be a communication facility that is connected to the ends of the communication paths extending, respectively, to the service provision terminal and the gateway terminal, and that at least includes a server function. The bundle management terminal may also be a terminal having both the client function and the server function. This applies hereinafter to a bundle management terminal according to the fifteenth and seventeenth aspects of the invention, a bundle data structure according to the nineteenth aspect of the invention, a service provision support method according to the twenty-first aspect of the invention, and a bundle generation method according to the twenty-third aspect of the invention.

In addition, to address or achieve the above, a bundle management terminal, according to the fourteenth aspect of the invention, is provided that is connected to a service provision terminal, and a service reception terminal, according to the third aspect of the invention, provided in a service provision support system so as to enable communication. The terminal includes:

a bundle generation device to generate a bundle upon receiving a request from the service provision terminal;

a bundle transmission device to transmit, to the service reception terminal, the bundle generated by the bundle generation device; and a charge processing device to perform charge processing to charge a part or all of a charge contained in a notification provided by charge notification device to the service provider.

The bundle includes:

a usage status detection device to detect the usage status of the service reception terminal, a charge calculation device to employ the usage status detected by the usage status detection device to calculate a charge that arises at the service reception terminal due to the provision of a service, and a charge notification device to transmit to the bundle management terminal a notification of the charge obtained by the charge calculation device.

With this configuration, the same operation can be obtained as is performed by the bundle management terminal for the service provision support system according to the third aspect of the invention.

Furthermore, according to the fifteenth aspect of the invention, a bundle management terminal, which is connected to a service provision terminal, and a gateway terminal in a service provision support system according to the thirteenth aspect of the invention, so as to enable communication, includes:

a bundle generation device to generate a bundle upon receiving a request from the service provision terminal;

a bundle transmission device to transmit, to the gateway terminal, the bundle generated by the bundle generation device; and a charge processing device to perform charge processing to charge a part or all of a charge contained a notification provided by charge notification device to the service provider.

The bundle includes:

a usage status detection device to detect the usage status of the service reception terminal, a charge calculation device to employ the usage status detected by the usage status detection device to calculate a charge that arises at the service reception terminal due to the provision of a service, and a charge notification device to transmit to the bundle management terminal a notification of the charge obtained by the charge calculation device.

With this configuration, the same operation can be obtained as is performed by the bundle management terminal for the service provision support system according to the thirteenth aspect of the invention.

Further, to address or achieve the above, a terminal program according to the sixteenth aspect of the invention is provided for use with a bundle management terminal according to the fourteenth aspect of the invention. The invention includes:

a program for generating a bundle upon receiving a request from a service provision terminal;

a program for transmitting, to a service reception terminal, the bundle generated by the bundle generation program; and a program for performing charge processing to charge a part or all of a charge contained a notification provided by a charge notification device to the service provider.

The bundle includes:

a program for detecting the usage status of the service reception terminal, a program for employing the usage status detected by the usage status detection program to calculate a charge that arises at the service reception terminal due to the provision of a service, and a program for transmitting to the bundle management terminal a notification of the charge obtained by the charge calculation program.

With this configuration, when the bundle management terminal reads a program and executes the processing in accordance with the program, the same operation can be effected as is performed by the bundle management terminal according to the fourteenth aspect of the invention.

In addition, to address or achieve the above, a terminal program according to the seventeenth aspect of the invention is provided for use with a bundle management terminal according to the fifteenth aspect of the invention.

The program includes:

a program for generating a bundle upon receiving a request from a service provision terminal;

a program for transmitting, to a gateway terminal, the bundle generated by the bundle generation means; and a program for performing charge processing to charge a part or all of a charge contained in a notification provided by charge notification device to the service provider.

The bundle includes:

a program for detecting the usage status of the service reception terminal, a program for employing the usage status detected by the usage status detection program to calculate a charge that arises at the service reception terminal due to the provision of a service, and a program for transmitting to the bundle management terminal a notification of the charge obtained by the charge calculation program.

With this configuration, when the bundle management terminal reads a program and executes the processing in accordance with the program, the same operation can be obtained as is performed by the bundle management terminal according to the fifteenth aspect of the invention.

Furthermore, to address or achieve the above, a bundle data structure according to an eighteenth aspect of the invention, which is applied for a service reception terminal in a service provision support system according to the third aspect of the invention, is provided that includes:

a usage status detection device to detect the usage status of the service reception terminal;

a charge calculation device to employ the usage status detected by the usage status detection device to calculate a charge that arises at the service reception terminal due to the provision of a service; and a charge notification device to transmit to a bundle management terminal a notification of the charge obtained by the charge calculation device.

With this configuration, upon receiving a bundle according to this aspect of the invention, the service reception terminal constitutes the usage status detection device, the charge calculation device, and the charge notification device based on the received bundle. Under these conditions, when the service provision terminal provides a service, the usage status detection device detects the usage status of the service reception terminal, and the charge calculation device employs the detected usage status to calculate a charge that arises at the service reception terminal due to the provision of a service. Then, the charge notification device notifies the bundle management terminal of the obtained charge.

Hereinafter the operation of the bundle management terminal is the same as that for the service provision support system according to the third aspect of the invention.

A bundle data structure according to the nineteenth aspect of the invention, which is applied for a gateway terminal in a service provision support system according to the thirteenth aspect of the invention, is provided that includes:

a usage status detection device to detect the usage status of a service reception terminal;

a charge calculation device to employ the usage status detected by the usage status detection device to calculate a charge that arises at the service reception terminal due to the provision of a service; and a charge notification device to transmit to a bundle management terminal a notification of the charge obtained by the charge calculation device.

With this configuration, upon receiving a bundle according to this aspect of the invention, the gateway terminal constitutes the usage status detection device, the charge calculation device, and the charge notification device based on the received bundle. Under these conditions, when the service provision terminal provides a service, the usage status detection device detects the usage status of the service reception terminal, and the charge calculation device employs the detected usage status to calculate a charge that arises at the service reception terminal due to the provision of a service. Then, the charge notification device notifies the bundle management terminal of the obtained charge.

Hereinafter the operation of the bundle management terminal is the same as that for the service provision support system according to the thirteenth aspect of the invention.

Moreover, to address or achieve the above, a service provision support method according to a twentieth aspect of the invention, is provided.

A service provision terminal, which is a service provision source, a service reception terminal, which is a service provision destination, and a bundle management terminal to manage a bundle are connected together so as to enable communication.

The service provision terminal, on an occasion to provide a service, applies the bundle for the service reception terminal.

A service provider is demanded for a charge that arises at the service reception terminal due to the provision of the service. The bundle includes:

a usage status detection device to detect the usage status of the service reception terminal, a charge calculation device to employ the usage status detected by the usage status detection device to calculate a charge that arises at the service reception terminal due to the provision of the service, and a charge notification device to transmit to the bundle management terminal a notification of the charge obtained by the charge calculation device. The method includes:

permitting the bundle management terminal to generate the bundle upon receiving a request from the service provision terminal;

permitting the bundle management terminal to transmit, to the service reception terminal, the bundle generated by the bundle generation step;

permitting the service reception terminal to constitute, upon receiving the bundle, the usage status detection device, the charge calculation device, and the charge notification device based on the received bundle; and permitting the bundle management terminal to perform charge processing to charge a part or all of the charge contained in the notification provided by the charge notification device to the service provider.

A service provision support method according to a twenty-first aspect of the invention is provided.

A gateway terminal to connect a service reception terminal, which is a service provision destination to enable communication, a service provision terminal, which is a service provision source, and a bundle management terminal, which is provided for the management of a bundle, are connected together so that they can communicate with each other.

The service provision terminal applies the bundle to the gateway terminal on an occasion to provide a service.

A service provider is demanded for a charge that arises at the service reception terminal due to the provision of the service. The bundle includes:

a usage status detection device to detect a usage status of the service reception terminal, a charge calculation device to employ the usage status detected by the usage status detection device to calculate a charge that arises at the service reception terminal due to the provision of the service, and a charge notification device to transmit to the bundle management terminal a notification of the charge obtained by the charge calculation device. The method includes:

permitting the bundle management terminal to generate the bundle upon receiving a request from the service provision terminal;

permitting the bundle management terminal to transmit, to the gateway terminal, the bundle generated by the bundle generation step;

permitting the gateway terminal to constitute, upon receiving the bundle, the usage status detection device, the charge calculation device, and the charge notification device based on the received bundle; and permitting the bundle management terminal to perform charge processing to charge a part or all of the charge contained in the notification provided by the charge notification device to the service provider.

To address or achieve the above, a bundle generation method according to the twenty-second aspect of the invention, to generate a bundle in a bundle data structure in accordance with the eighteenth aspect of the invention, is provided that includes:

generating the bundle upon receiving a request from the service provision terminal.

The bundle includes:

a usage status detection device to detect the usage status of the service reception terminal, a charge calculation device to employ the usage status detected by the usage status detection device to calculate a charge that arises at the service reception terminal due to the provision of a service, and a charge notification device to transmit to a bundle management terminal a notification of a charge obtained by the charge calculation device.

Further, a bundle generation method according to the twenty-third aspect of the invention, to generate a bundle in a bundle data structure in accordance with the nineteenth aspect of the invention, is provided that includes:

generating the bundle upon receiving a request from the service provision terminal.

The bundle includes:

a usage status detection device to detect the usage status of the service reception terminal, a charge calculation device to employ the usage status detected by the usage status detection device to calculate a charge that arises at the service reception terminal due to the provision of a service, and a charge notification device to transmit to a bundle management terminal a notification of a charge obtained by the charge calculation device.

DETAILED DESCRIPTION OF PREFERRED EMBODIMENTS

Figure 1:
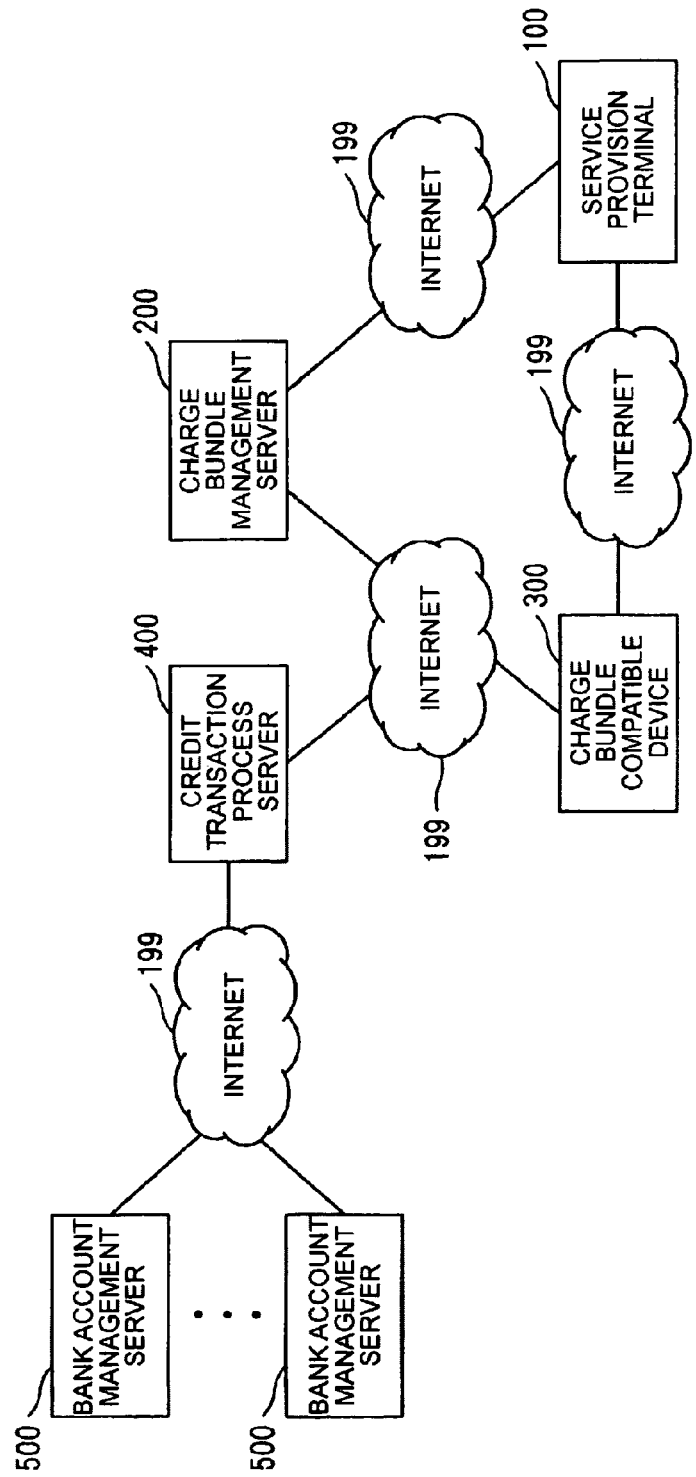
FIG. 1 is a schematic of a network system for which the present invention is applied.

Exemplary embodiments of the present invention are described while referring to the drawings. FIGS. 1 to 16 are schematics showing a service provision support system, a bundle management terminal, a terminal program, a bundle data structure, a service provision support method, and a bundle generation method according to one exemplary embodiment of the present invention.

In this exemplary embodiment, as is shown in FIG. 1, the service provision support system, the bundle management terminal, the terminal program, the bundle data structure, the service provision support method, and the bundle generation method according to the invention are applied for a case wherein a service provision terminal 100 provides a contents distribution service to distribute contents for a charge bundle compatible device 300 across the Internet 199.

[1. Configuration for the Exemplary Embodiment]

[1-1. Overview of a System Configuration]

First, the configuration of a network system to which the present invention is applied is described while referring to FIG. 1. FIG. 1 is a schematic showing the configuration of the network system according to the invention.

As is shown in FIG. 1, connected to the Internet 199 are: the service provision terminal 100 to provide the contents distribution service, a charge bundle management server 200 to manage a charge bundle to charge a service provider for a charge (hereinafter "a usage charge") that has arisen due to the provision of the contents distribution service; a charge bundle compatible device 300 that is constituted by a network printer, etc., and that can incorporate a charge bundle; a credit transaction processing server 400 to perform a transaction process based on the charge results indicated by the charge bundle; and a plurality of bank account management servers 500 installed in banks to manage accounts. In order for the present invention to be easily understood, only one service provision terminal 100 and one charge bundle compatible device 300 are provided. However, multiple service provision terminals 100 and multiple charge bundle compatible devices 300 are actually connected to the Internet 199.

[1-2-1. Configuration of a Service Provision Terminal]

Figure 2:
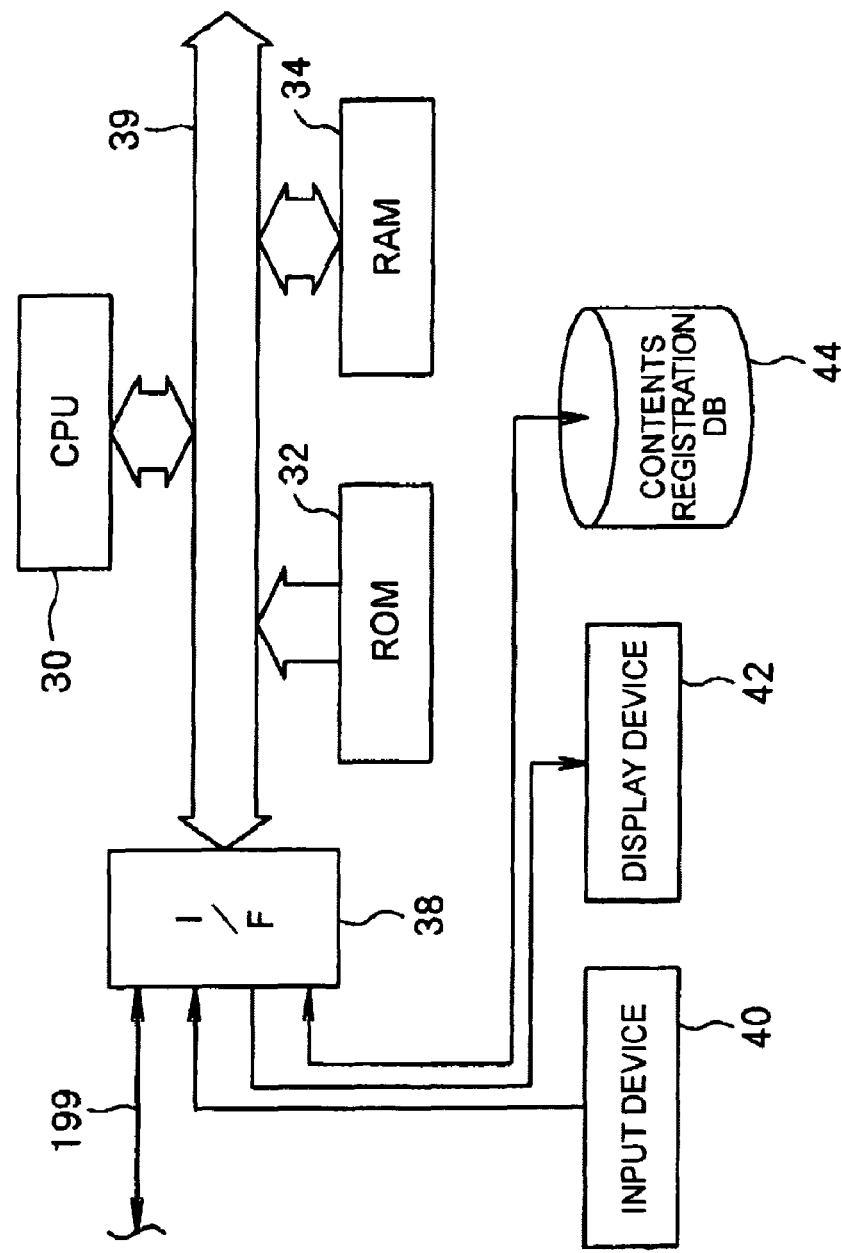
FIG. 2 is a schematic showing a service provision terminal 100.

The configuration of the service provision terminal 100 is described in detail while referring to FIG. 2. FIG. 2 is a schematic showing the configuration of the service provision terminal 100.

The service provision terminal 100 distributes contents, such as advertisements; to the charge bundle compatible device 300 to permit the charge bundle compatible device 300 to print the contents, so as to provide the contents distribution service. As is shown in FIG. 2, the configuration specifically includes: a CPU 30 to employ a control program to perform computations and to control the entire system; a ROM 32 in which the control program for the CPU 30, etc., are stored in a predetermined area in advance; a RAM 34 used to store data read from the ROM 32, etc., and computation results required for the operation of the CPU 30; and an I/F 38 that permits data input and output relative to an external device. These components are connected together by a bus 39, which is a signal line used for the transfer of data that can also exchange data.

Connected to the I/F 38 are an input device 40, such as a keyboard or a mouse, that serves as a human interface for the entry of data; a display device 42, which displays a screen based on an image signal; a contents registration database (hereinafter a database is referred to simply as "a DB") 44 in which multiple contents are registered; and signal lines used for connecting with the Internet 199.

Figure 3:
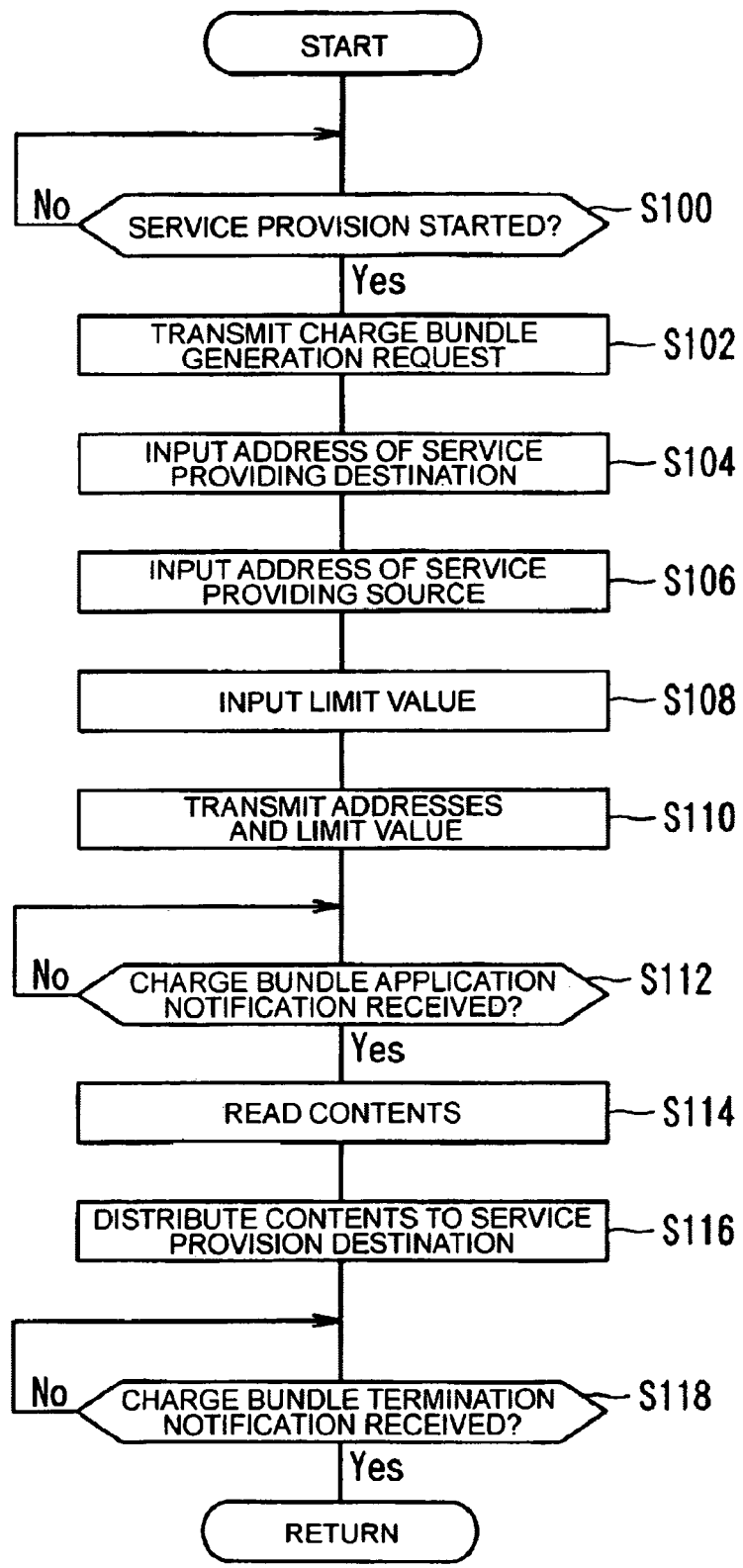
FIG. 3 is a flowchart showing a charge bundle generation request process.

The CPU 30, which is, for example, a micro processing unit, MPU, activates a predetermined program stored in the predetermined area of the ROM 32, and executes the charge bundle generation request processing shown in the flowchart in FIG. 3 in accordance with the program. FIG. 3 is a flowchart showing the charge bundle generation request processing.

[1-2-2. Process Performed by a Service Provision Terminal]

The charge bundle generation request processing is a process to request that the charge bundle management server 200 perform the generation of a charge bundle. When the CPU 30 executes this processing, as is shown in FIG. 3, first, the routine is shifted to step S100.

At step S100, a check is performed to determine whether the provision of the contents distribution service should be started. When it is ascertained that the provision of the contents distribution service should be started (Yes), the routine advances to step S102. When it is ascertained that the service provision should not be started (No), the routine waits at step S100 until the provision of the contents distribution service can be started.

At step S102 a charge bundle generation request is transmitted to the charge bundle management server 200, and the routine advances to step S104, whereat the address of the charge bundle compatible device 300, which is a service provision destination, is entered. The routine then advances to step S106, whereat the address of the service provision terminal 100, which is a service provision source, is entered. The routine thereafter advances to step S108.

At step S108, the value limit for a charge by the service provider is entered, and the routine advances to step S110. Then, the addresses entered at steps S104 and S106, and the value limit entered at step S108 are transmitted to the charge bundle management server 200, and the routine advances to step S112.

At step S112, a check is performed to determine whether a charge bundle application notification, which indicates that the charge bundle has been applied for the service reception terminal, has been received. When it is ascertained that a charge bundle application notification has been received (Yes), the routine advances to step S114. When it is not ascertained that a charge bundle application notification has been received (No), the routine waits at step S112 until a notification is received.

At step S114, the contents to be distributed are read from the content registration DB 44, and the routine advances to step S116, whereat the contents that have been read are distributed to the charge bundle compatible device 300, which is a service provision destination. The routine then advances to step S118.

At step S118, a check is performed to determine whether a charge bundle termination notification, indicating that the charge bundle was terminated at the service reception terminal, has been received. When it is ascertained that a charge bundle termination notification has been received (Yes), this process sequence is terminated and the routine is returned to the original processing. When it is not ascertained that a charge bundle termination notification has been received (No), the routine remains at step S118 until a charge bundle termination notification is received.

[1-3-1. Configuration of a Charge Bundle Management Server]

Figure 4:
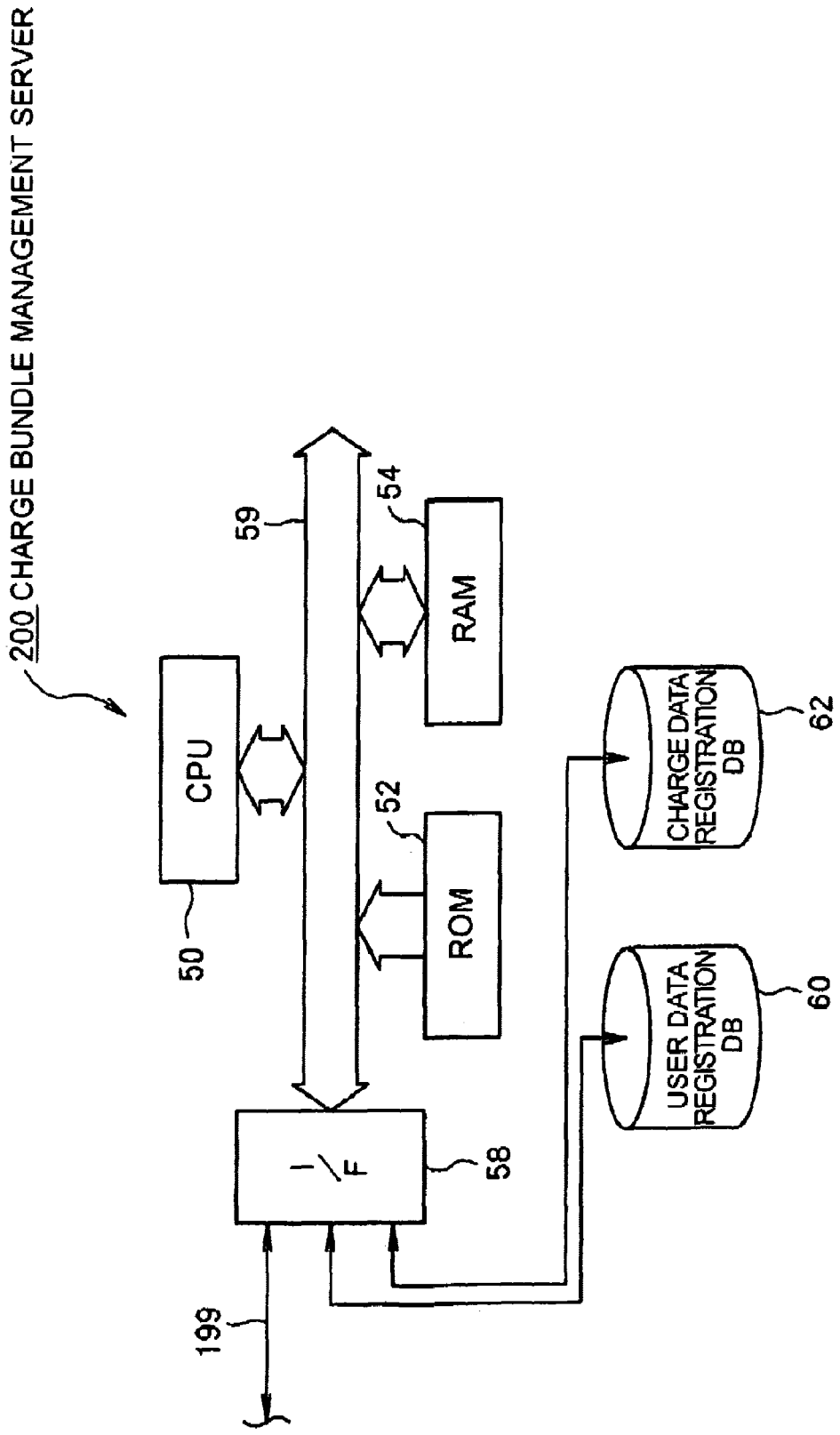
FIG. 4 is a schematic of a change bundle management server 200.

The configuration of the charge bundle management server 200 is described in detail while referring to FIG. 4. FIG. 4 is a schematic showing the configuration of the charge bundle management server 200.

As is shown in FIG. 4, the charge bundle management server 200 includes: a CPU 50, which employs a control program to perform computations and to control the entire system; a ROM 52, where the control programs for the CPU 50, etc., are stored in advance in a predetermined area; a RAM 54, which is used to store data read from the ROM 52 and the computation results required for the operation of the CPU 50; and an I/F 58, which permits the input/output of data relative to an external device. These components are connected by a bus 59, which is a signal line to transfer data, and can exchange data.

Connected to the I/F 58 are external devices, a user data registration DB 60 to store user data concerning the user of the charge bundle compatible device 300; a charge data registration DB 62 to store charge data; and a signal line to connect to the Internet 199.

The CPU 50, which is, for example, a micro processing unit, MPU, activates a predetermined program stored in the predetermined area of the ROM 52, and performs the user registration process, the user management process, the charge bundle generation process, and the charge process, for the flowcharts in FIGS. 5, 6, 7, and 9, in a time sharing manner and in accordance with the program.

[1-3-2. Process 1 Performed by a Charge Bundle Management Server]

Figure 5:
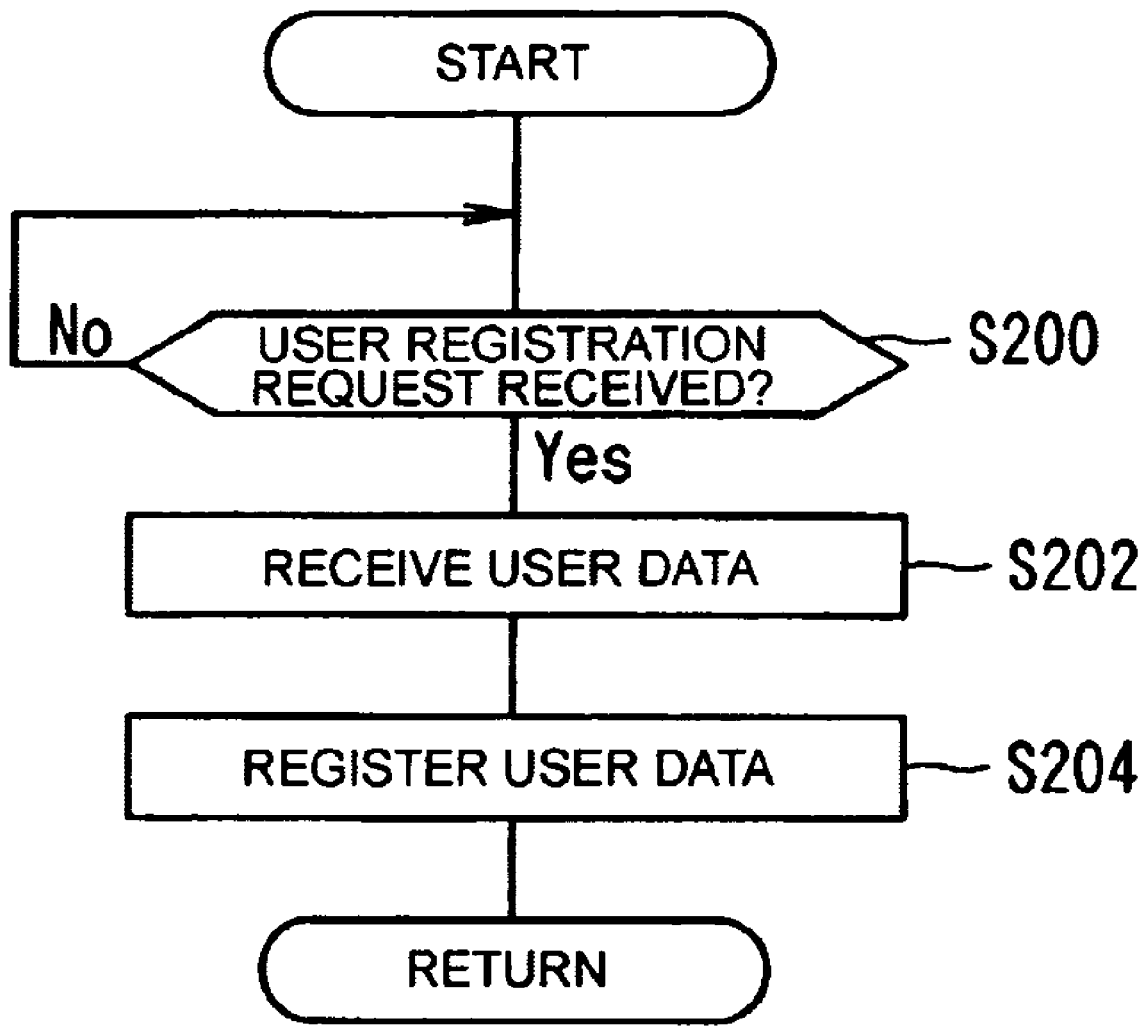
FIG. 5 is a flowchart showing a user registration process.

First, the user registration process is described in detail while referring to FIG. 5. FIG. 5 is a flowchart showing the user registration process.

The user registration process is a process to register user data in accordance with a user registration request. When this process is executed by the CPU 50, as is shown in FIG. 5, first, the routine is moved to step S200.

At step S200, a check is performed to determine whether a user registration request has been received. When it is ascertained that a user registration request has been received (Yes), the routine advances to step S202. When it is not ascertained that a user registration request has been received (No), the routine remains at step S200 until a request has been received. The user of the charge bundle compatible device 300, for example, employs one of the terminals on the Internet 199 to transmit the user registration request.

At step S202, the user data are received that include, for example, a user name, a password, a name, an address, a gender, an age, an occupation, a membership group, a service the provision of which is permitted, and the address of the charge bundle compatible device 300. The routine then advances to step S204, and the user data that has been received is registered in the user data registration DB 60. The process is thereafter terminated and the routine is returned to the original process.

[1-3-3. Process 2 Performed by a Charge Bundle Management Server]

Figure 6:
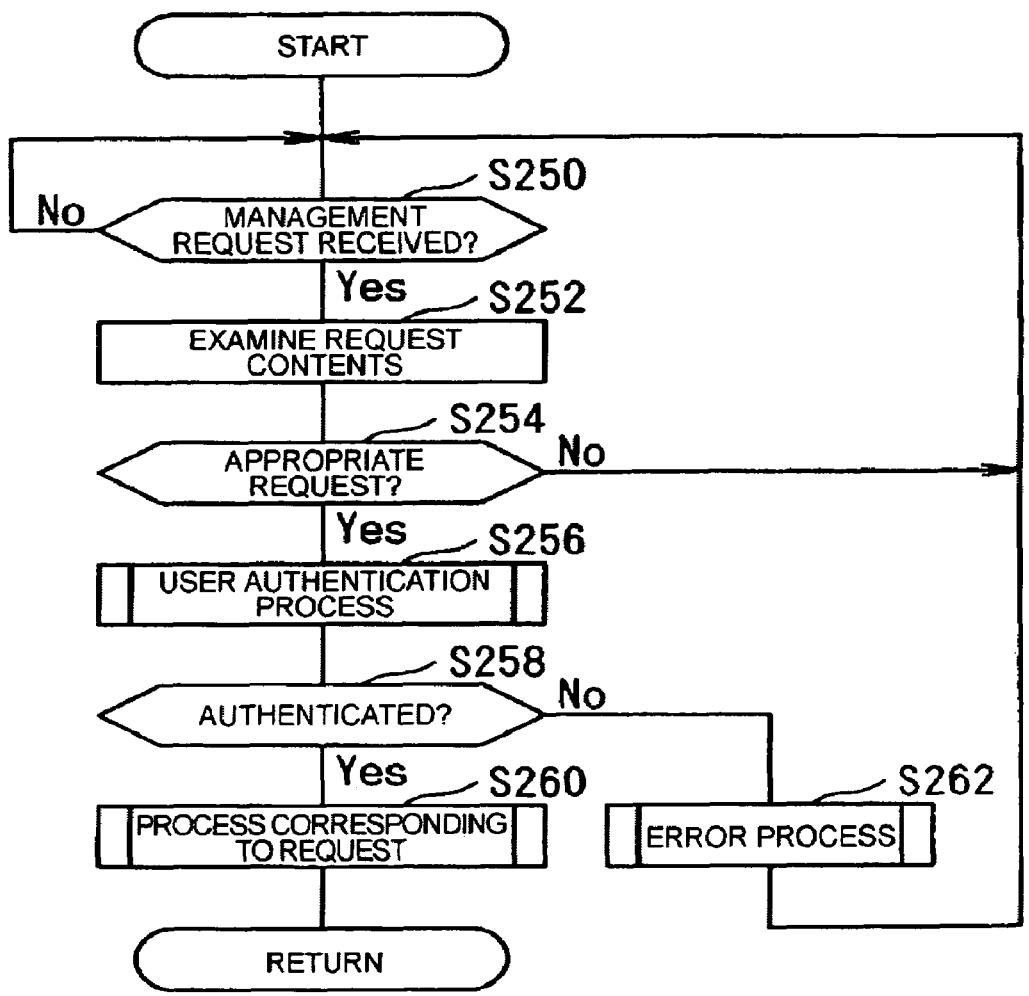
FIG. 6 is a flowchart showing a user management process.

The user management process is described in detail while referring to FIG. 6. FIG. 6 is a flowchart showing the user management process.

The user management process is a process used to disclose user data in accordance with a management request. When this process is executed by the CPU 50, as is shown in FIG. 6, first, the routine is moved to step S250. Thereat, the service provider can issue a management request to the charge bundle management server 200, and can obtain the user data for an unknown user. Since the access right that permits such and access can be set only for a specific service or a specific service provider, the service provider can not obtain all the registered user data, but can obtain only that user data that the service provider is permitted to access.

At step S250, a check is performed to determine whether a management request has been received. When it is ascertained that a management request has been received (Yes), the routine advances to step S252. When it is not ascertained that a management request has been received (No), the routine remains at step S250 until a management request has been received.

At step S252, the contents of the request are examined, and the routine advances to step S254 whereat the examination results are employed to determine whether the management request is appropriate. When it is ascertained that the management request is appropriate (Yes), the routine moves to step S256.

At step S256, the user authentication process is performed for the user who issued the management request, or for the service provider. The routine then moves to step S258, whereat the authentication results are employed to determine whether the user authentication has been obtained. When it is ascertained that the user authentication has been obtained (yes), the routine advances to step S260, whereat a process corresponding to the contents of the management request is performed. The process sequence is thereafter terminated and the routine returns to the original process. Specifically, at step S260 the user data is changed or updated when the management request designates the changing or the updating of the user data. In this case, the user will have transmitted the management request to the charge bundle management server 200. When the management requests that the changing or the updating of the service provider data, the service provider data is changed or updated. And when the management request designates the disclosure of the user data, the user data are disclosed to a requesting source. Thereafter, when the management request designates the disclosure of the charge bundle compatible device 300, the charge bundle compatible device 300 is disclosed to the requesting source. These situations apply in those cases wherein the service provider has transmitted a management request to the charge bundle management server 200.

When it is ascertained at step S258 that the user authentication can not be obtained (No), the routine moves to step S262, whereat an error process is performed, and the routine then returns to step S250.

[1-3-4. Process 3 Performed by a Charge Bundle Management Server]

Figure 7:
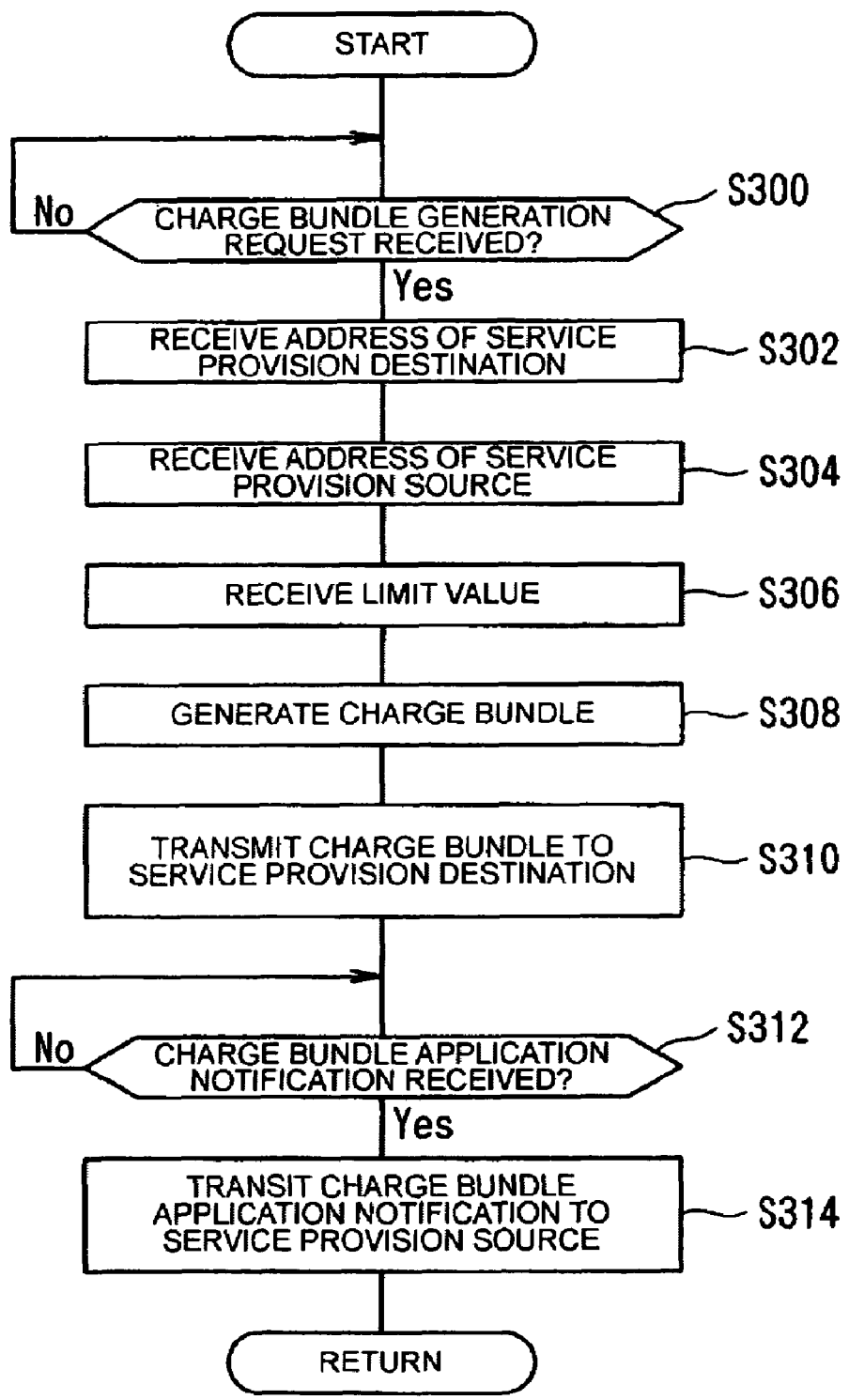
FIG. 7 is a flowchart showing a charge bundle generation process.

The charge bundle generation process is described in detail while referring to FIG. 7. FIG. 7 is a flowchart showing the charge bundle generation process.

The charge bundle generation process is a process for the generation of a charge bundle in accordance with a charge bundle generation request, and for the application of the charge bundle to a service provision destination. When this process is executed by the CPU 50, as is shown in FIG. 7, first, the routine is moved to step S300.

At step S300, a check is performed to determine whether a charge bundle generation request has been received. When it is ascertained that a charge bundle generation request has been received (Yes), the routine advances to step S302. When it is not ascertained that a charge bundle generation request has been received (No), the routine remains at step S300 until this request is received.

At step S302, the address of the service provision destination is received, and the routine advances to step S304, whereat the address of the service provision source is received. The routine then moves to step S306, whereat the value limit is received, and the routine moves to step S308, whereat the charge bundle is generated based on the received value limit. In this process, a charge bundle that corresponds to a service provided by the service provision terminal 100 is generated in accordance with a request received from the service provision terminal 100.

Figure 8:
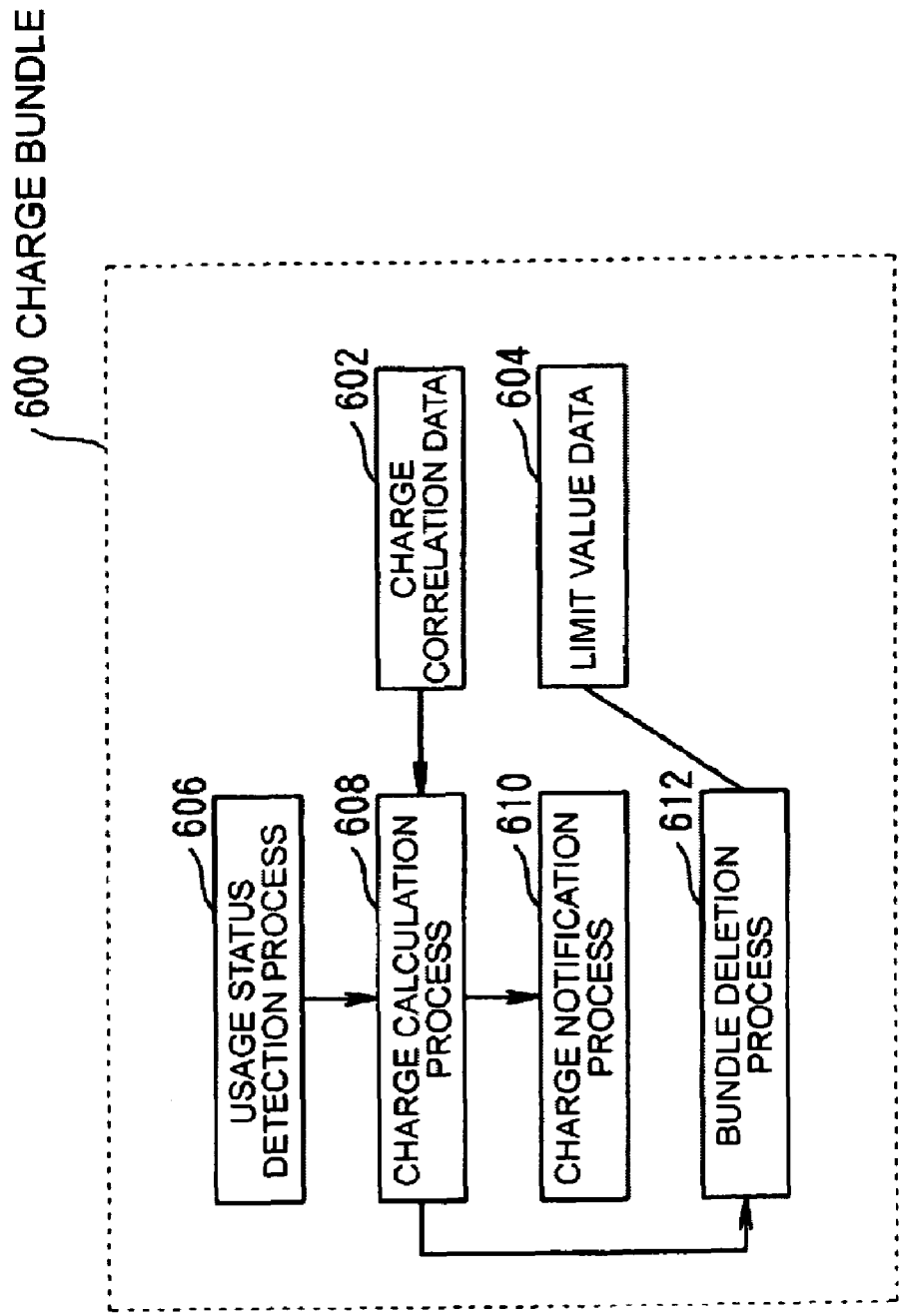
FIG. 8 is a schematic showing the data structure of a charge bundle.

The data structure of a charge bundle is explained in detail while referring to FIG. 8. FIG. 8 is a schematic showing the data structure of a charge bundle.

As is shown in FIG. 8, the charge bundle includes: charge correlation data 602, indicating the correlation between the amount of expendable supplies consumption, the amount of communication and the amount of electric consumption, and the charge; value limit data 604, indicating a value limit; program data 606 to permit the charge bundle compatible device 300 to perform a usage status detection process; program data 608 to permit the charge bundle compatible device 300 to perform the charge calculation process; program data 610 to permit the charge bundle compatible device 300 to perform the charge notification process; program data 612 to permit the charge bundle compatible device 300 to perform the bundle deletion process. The usage status detection process, the charge calculation process, the charge notification process, and the bundle deletion process will be described in detail.

While referring again to FIG. 7, at step S310, based on the address of the received service providing destination, the generated charge bundle is transmitted to the charge bundle compatible device 300, which is a service providing destination. The routine then moves to step S312.

At step S312, a check is performed to determine whether the charge bundle application notification has been received. When it is ascertained that the charge bundle application has been received (Yes), the routine advances to step S314. When it is not ascertained that the charge bundle application notification has been received (No), the routine remains at step S312 until the charge bundle application notification is received.

At step S314, based on the address received for the service providing source, the charge bundle application notification is transmitted to the service provision terminal 100, which is the service provision source. Then, the process sequence is terminated, and the routine is returned to the original process.

[1-3-5. Process 4 Performed by a Charge Bundle Management Server]

Figure 9:
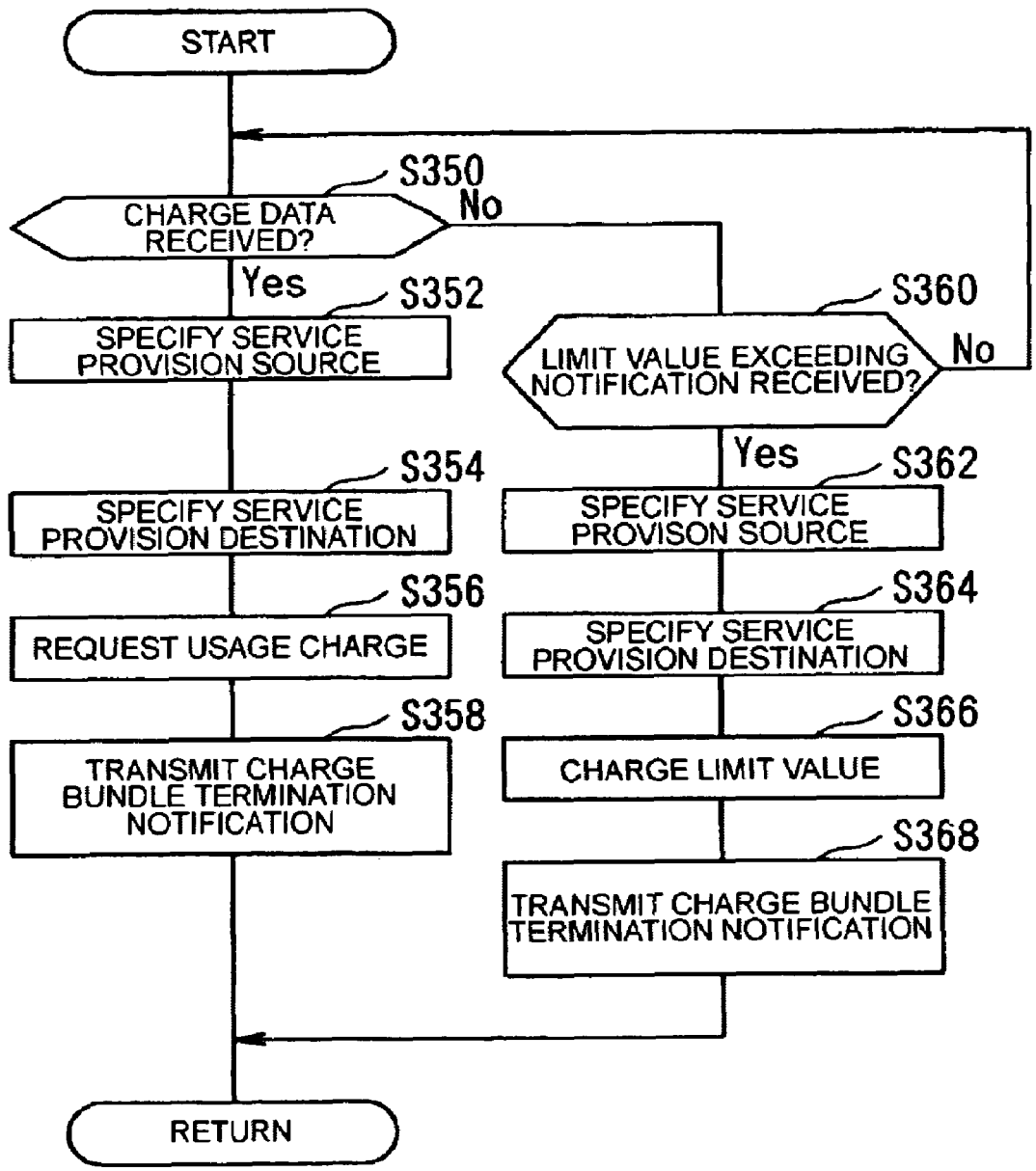
FIG. 9 is a flowchart showing a charge process.

The charge process is described in detail while referring to FIG. 9. FIG. 9 is a flowchart showing the charge process.

The charge process is a process for demanding that a service provider for a charge. When this process is executed by the CPU 50, as is shown in FIG. 9, first, the routine is moved to step S350.

At step S350, a check is performed to determine whether the charge data from the charge bundle has been received. When it is ascertained that the charge data has been received (Yes), the routine advances to step S352, whereat a service provision source is specified based on the received charge data. The routine moves to step S354, and a service provision destination is specified based on the received charge data. The routine then moves to step S356, whereat the charge is done to the service provider, and the charge results are registered in the charge data registration DB 62. The routine then moves to step S358, and the charge bundle termination notification is transmitted to the service provision terminal 100, which is the service provision source. Thereafter the process sequence is terminated and the routine is returned to the original process.

When it is ascertained at step S350 that the charge data has not been received (No), the routine is shifted to step S360 and a check is performed to determine whether a value limit exceeding notification, indicating the charge has reached the value limit, has been received. When it is ascertained that the value limit exceeding notification has been received (Yes), the routine advances to step S362.

At step S362, a service provision source is specified based on the received value limit exceeding notification, and the routine advances to step S364, whereat a service provision destination is specified based on the received value limit exceeding notification. Then, the routine advances to step S366, whereat the value limit is charged to the service provider, and the charge results are registered in the charge data registration DB 62. The routine then advances to step S368, and the charge bundle termination notification is transmitted to the service provision terminal 100, which is a service provision source. The process sequence is thereafter terminated and the routine is returned to the original process.

When it is ascertained at step S360 that the value limit exceeding notification has not been received (No), the routine returns to step S350.

[1-4-1. Configuration of a Charge Bundle Compatible Device]

Figure 10:
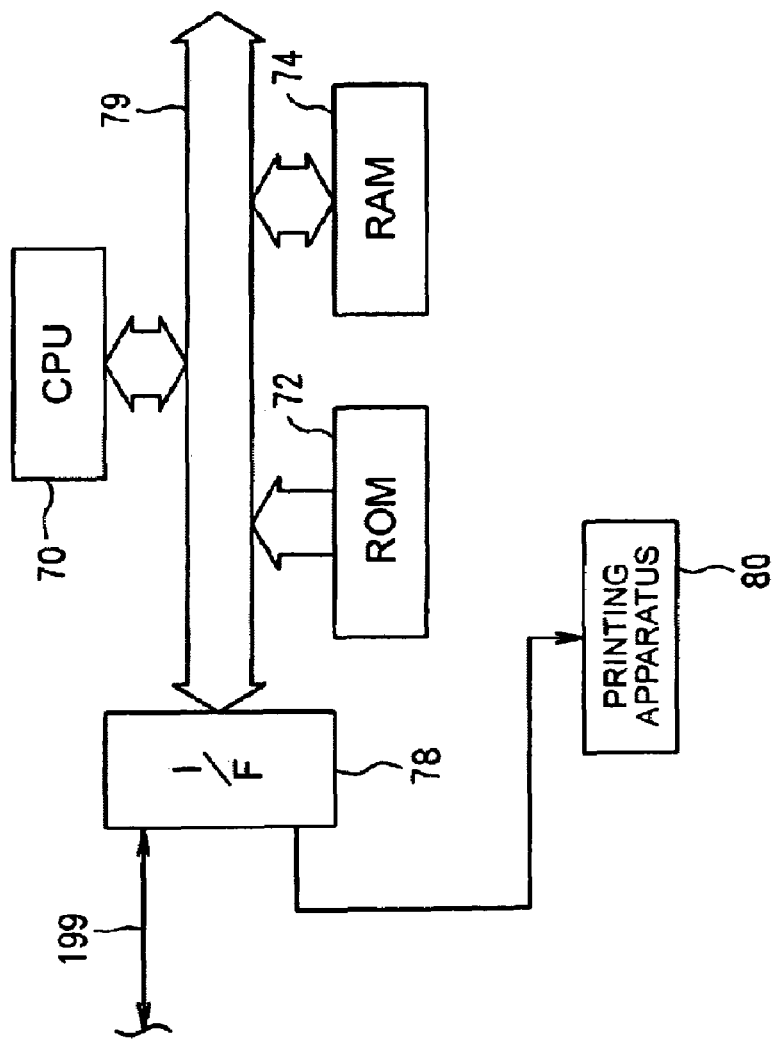
FIG. 10 is a schematic showing the configuration of a charge bundle compatible device 300.

The configuration of the charge bundle compatible device 300 is explained in detail while referring to FIG. 10. FIG. 10 is a schematic showing the configuration of the charge bundle compatible device 300.

As is shown in FIG. 10, the charge bundle compatible device 300 includes: a CPU 70, which employs a control program to perform computations and to control the entire system; a ROM 72, in which the control program for the CPU 70, etc., are stored in advance in a predetermined area; a RAM 74, which is used to store data read from the ROM 72 and the computation results required for the operation of the CPU 70; and an I/F 78, which permits the data input/output relative to an external device. These components are connected by a bus 79, which is a signal line for the transfer of data, and can exchange data.

Connected to the I/F 78 are external devices, a printing apparatus 80 that performs printing and a signal line for connection to the Internet 199.

Figure 11:
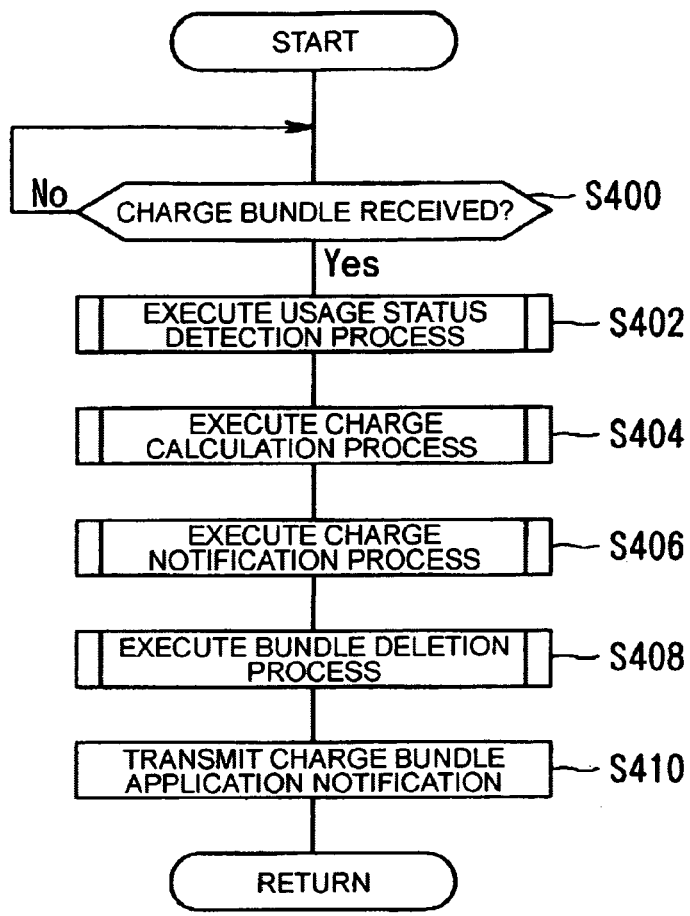
FIG. 11 is a flowchart showing a charge bundle constituent process.
Figure 12:
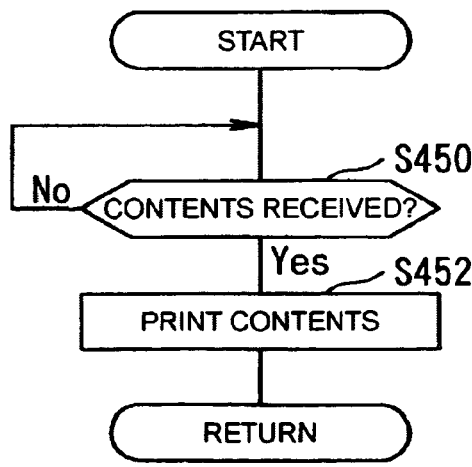
FIG. 12 is a flowchart showing a contents printing process.

The CPU 70, which is, for example, a micro processing unit, MPU, activates a predetermined program stored in a predetermined area of the ROM 72, and performs the charge bundle component process and the contents printing process in the flowcharts in FIGS. 11 and 12 in a time sharing manner in accordance with the predetermined program.

[1-4-2. Process 1 Performed by a Charge Bundle Compatible Device]

The charge bundle component process is described in detail while refer to FIG. 11. FIG. 11 is a flowchart showing the charge bundle component process.

The charge bundle component process is a process to receive a charge bundle and to perform, in a time sharing manner, various processes included in the received charge bundle. When this process is executed by the CPU 70, as is shown in FIG. 11, first, the routine is shifted to step S400.

At step S400 a check is performed to determine whether the charge bundle has been received. When it is ascertained that the charge bundle has been received (Yes), the routine advances to step S402. When it is not ascertained that the charge bundle has been received (No), the routine remains at step S400 until the charge bundle is received.

At step S402, the usage status detection process is performed, based on the program data 606 included in the charge bundle. The routine is then shifted to step S404, and the charge calculation device process is performed based on the program data 608 included in the charge bundle. The routine thereafter advances to step S406.

At step S406, the charge notification process is performed, based on the program data 610 included in the charge bundle. The routine then advances to step S408 and the bundle deleting process is performed, based on the program data 612 included in the charge bundle. The routine is then shifted to step S410, and the charge bundle application notification is transmitted to the charge bundle management server 200. Thereafter, the process sequence is terminated and the routine is returned to the original process.

[1-4-3. Process 2 Performed by a Charge Bundle Compatible Device]

The contents printing process is described while referring to FIG. 12. FIG. 12 is a flowchart showing the contents printing process.

The contents printing process is a process to receive and print contents. When this process is executed by the CPU 70, as is shown in FIG. 12, first, the routine is shifted to step S450.

At step S450, a check is performed to determine whether the contents have been received. When it is ascertained that the contents have been received (Yes), the routine advances to step S452. When it is not ascertained that the contents have been received (No), the routine remains at step S450 until the contents are received.

At step S452, the received contents are printed by the printing apparatus 80. Thereafter, the process sequence is terminated and the routine returns to the original process.

[1-4-4. Process 3 Performed by a Charge Bundle Compatible Device]

Figure 13:
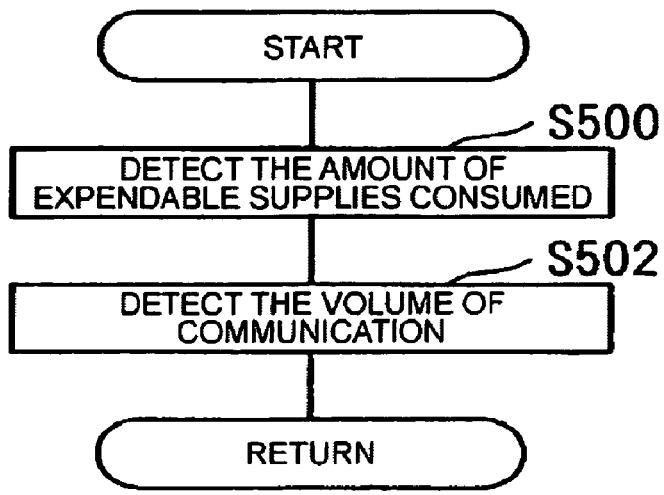
FIG. 13 is a flowchart showing a usage status detection process.

The usage status detection process is described in detail while referring to FIG. 13. FIG. 13 is a flowchart showing the usage status detection process.

The usage status detection process is a process to detect the usage status of the charge bundle compatible device 300. When this process is executed by the CPU 70, as is shown in FIG. 13, first, the routine is shifted to step S500.

At step S500, the amount of expendable supplies consumed for the printing performed by the printing apparatus 80 is detected. The routine then advances to step S502, and the amount of communication and the amount of electric consumption of the charge bundle compatible device 300 are detected as the usage status. The process sequence is thereafter terminated and the routine is returned to the original process.

[1-4-5. Process 4 Performed by the Charge Bundle Compatible Device]

Figure 14:
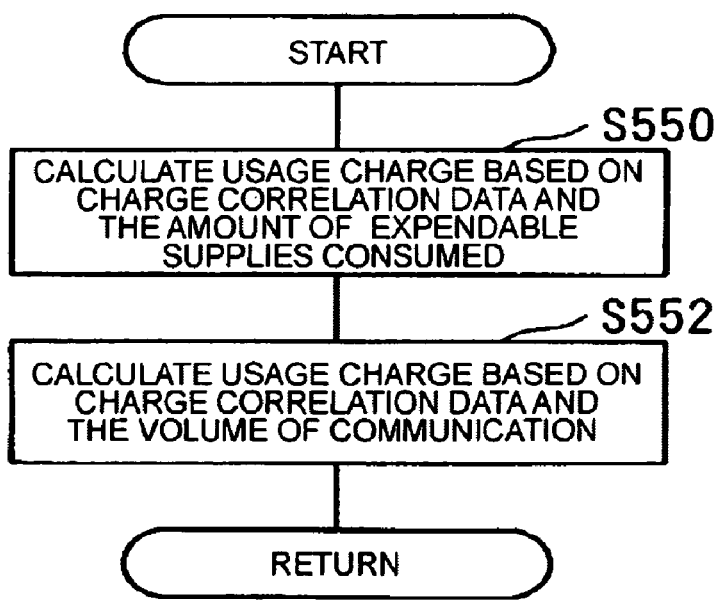
FIG. 14 is a flowchart showing a charge calculation process.

The charge calculation process is described in detail while referring to FIG. 14. FIG. 14 is a flowchart showing the charge calculation process.

The charge calculation process is a process to calculate a usage fee based on the usage status detected during the usage status detection process. When this process is executed by the CPU 70, as is shown in FIG. 14, first, the routine is shifted to step S550.

At step S550, the usage charge is calculated based on the charge correlation data included in the charge bundle and the extent of the expendable supplies consumption that is detected. The routine then moves to step S552, and the usage charge is calculated based on the charge correlation data included in the charge bundle, the volume of the communication and amount of electricity consumed that are detected. Thereafter, the process sequence is terminated and the routine is returned to the original process.

[1-4-6. Process 5 Performed by the Charge Bundle Compatible Device]

Figure 15:
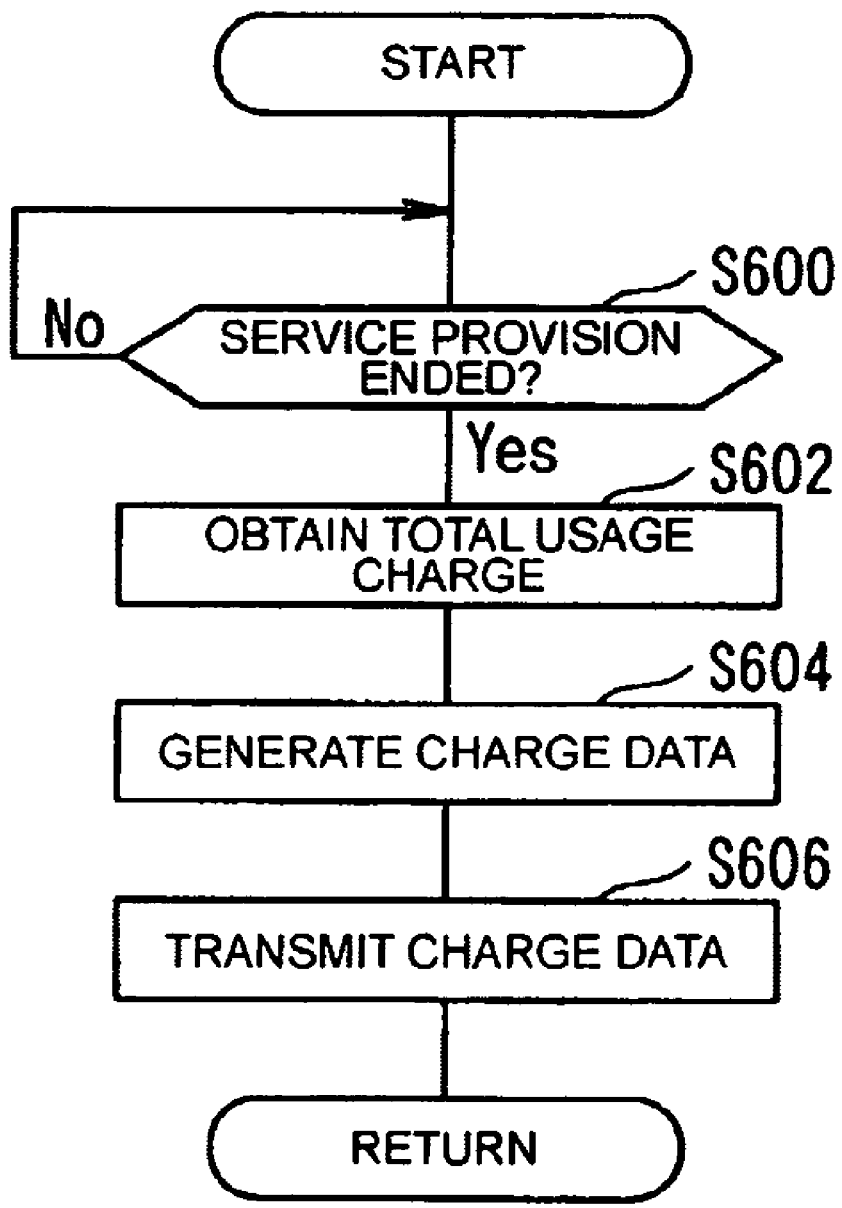
FIG. 15 is a flowchart showing a charge notification process.

The charge notification process is described in detail while referring to FIG. 15. FIG. 15 is a flowchart showing the charge notification process.

The charge notification process is a process to notify the charge bundle management server 200 of the usage charge obtained during the charge calculation process. When this process is executed by the CPU 70, as is shown in FIG. 15, first, the routine is shifted to step S600.

At step S600, a check is performed to determine whether the provision of the contents distribution service has ended. When it is ascertained that the provision of the contents distribution service has ended (Yes), the routine advances to step S602. When it is not ascertained that the provision of the contents distribution service has ended (No), the routine remains at step S600 until the provision of this service is ended.

At step S602, the total usage charge is obtained, and the routine advances to step S604, whereat the charge data is generated, based on the obtained usage charge. Then, the routine is shifted to step S606, whereat the obtained charge data is transmitted to the charge bundle management server 200. The process sequence is thereafter terminated, and the routine is returned to the original process.

[1-4-7. Process 6 Performed by the Charge Bundle Compatible Device]

Figure 16:
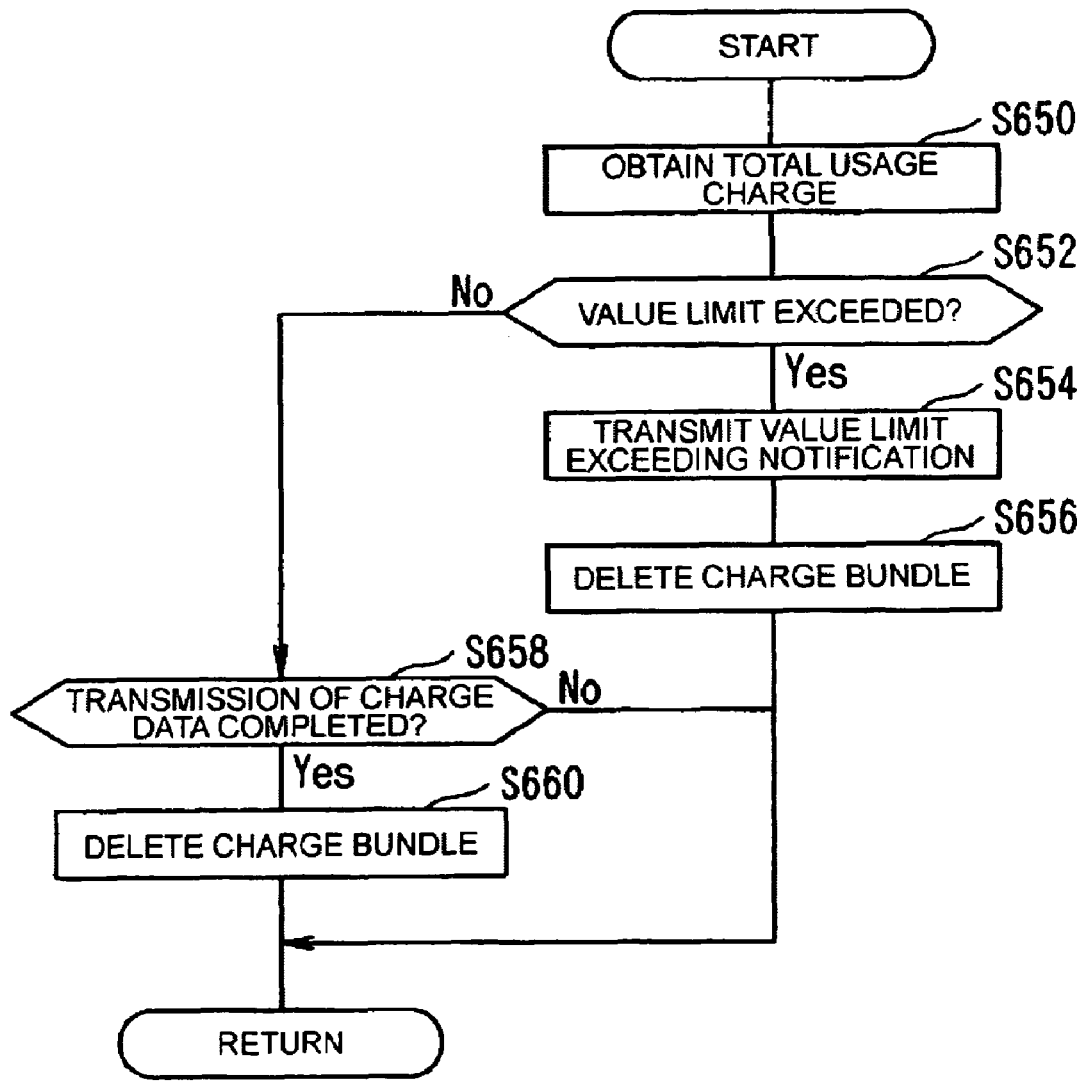
FIG. 16 is a flowchart showing a bundle deletion process.

The bundle deletion process is described in detail while referring to FIG. 16. FIG. 16 is a flowchart showing the bundle deletion process.

The bundle deletion process is a process for the deletion of the charge bundle. When this process is executed by the CPU 70, as is shown in FIG. 16, first, the routine is shifted to step S650.

At step S650, the total usage charge is obtained, and the routine advances to step S652, whereat a check is performed to determine whether the obtained usage charge has reached the value limit specified in the value limit data included in the charge bundle. When it is ascertained that the usage charge has reached the value limit (Yes), the routine advances to step S654.

At step S654, the value limit exceeded notification is transmitted to the charge bundle management server 200. The routine advances to step S656, and the charge bundle is deleted. The process sequence is thereafter terminated, and the routine is returned to the original process.

When it is ascertained at step S652 that the usage charge has not reached the value limit (No), the routine is shifted to step S658 and a check is performed to determine whether the transmission of the charge data has been completed. When it is ascertained that the transmission of the charge data has been completed (Yes), the charge bundle is deleted. The process sequence is thereafter terminated, and the routine is returned to the original process.

When it is ascertained at step S658 that the transmission of charge data has not been completed (No), the process sequence is terminated, and the routine is returned to the original process.

[1-5. Configuration of a Credit Transaction Process Server]

The configuration of the credit transaction process server 400 is described in detail.

The credit transaction process server 400 is connected across the Internet 199 to a bank account management server 500, to manage the account of a service provider, and a bank account management server 500 to manage the account of the user of the charge bundle compatible device 300. Based on the charge data received from the charge bundle management server 200, a request to the bank account management server 500 is issued for that part of the usage charge that should be paid by the service provider to be shifted (transferred) from the account of the service provider to the account of the user.

[2. Operation for the Exemplary Embodiment]

The operation for this exemplary embodiment is explained.

[2-1. Operation 1]

An explanation will now be given for a case where the service provider for the service provision terminal 100 provides a contents distribution service.

On the occasion for starting to provide the contents distribution service, at steps S100 and S102, the service provision terminal 100 transmits the charge bundle generation request to the charge bundle management server 200. Then, at steps S104 to S108, the address of the charge bundle compatible device 300, which is a service provision destination, the address of the service provision terminal 100, which is a service provision source, and the value limit for the charge to the service provider are entered. To enter these addresses, the user data and the service provider data stored in the charge bundle management server 200 are employed. When the addresses and the value limit are entered, at step S110 the input addresses and the limit value are transmitted to the charge bundle management server 200.

Upon receiving the charge bundle generation request, at steps S300 to S308 the charge bundle management server 200 receives the address of the service provision destination, the address of the service provision source, and the value limit, and generates a charge bundle based on the received value limit. Then, at step S310, the generated charge bundle is transmitted to the charge bundle compatible device 300 based on the received address for the service provision destination.

Upon receiving the charge bundle, at steps S400 to S410 the charge bundle compatible device 300 performs the usage status detection process, the charge calculation process, the charge notification process, and the bundle deletion process based on the program data 606 to 612 included in the charge bundle. Then, the charge bundle application notification is transmitted to the charge bundle management server 200.

Upon receiving the charge bundle application notification, at steps S312 and S314 the charge bundle management server 200 transmits the charge bundle application notification to the service provision terminal 100, based on the received address for the service provision source.

Upon receiving the charge bundle application notification, at steps S112 to S116 the service provision terminal 100 reads, from the contents registration DB 44, contents to be distributed, and distributes the contents to the charge bundle compatible device 300.

When the charge bundle compatible device 300 receives the contents, at steps S450 and S452 the printing apparatus 80 prints the received contents. And when the printing is performed by receiving the contents distribution service, the amount of expendable supplies consumed for the printing by the printing apparatus 80, the volume of the communication and the amount of electricity consumed by the charge bundle compatible device 300 are detected through the usage status detection process at steps S500 and S502. Then, through the charge calculation process at steps S550 and S552, the usage charge is calculated based on the charge correlation data included in the charge bundle and the amount of expendable supplies consumption that is detected, and the usage charge is also calculated based on the charge correlation data included in the charge bundle, and the volume of the communication and the amount of electricity consumed that are detected. When the provision of the contents distribution service is ended, through the charge notification process at steps S600 to S606, the total usage charge is obtained, and the charge data is generated by the obtained usage charge and is transmitted to the charge bundle management server 200. Since the transmission of the charge data is thus completed, the charge bundle is deleted through the bundle deletion process at steps S650, S658 and S660. As a result, the usage status detection process, the charge calculation process, the charge notification process, and the bundle deletion process are terminated.

Upon receiving the charge data, at steps S350 to S358 the charge bundle management server 200 employs the received charge data to specify the service provision source and the service provision destination, charges the service provider for the usage charge, and transmits the charge bundle termination notification to the service provision terminal 100. When the charge process has been completed, together with the accounts settlement request, the charge data is transmitted to the credit transaction process server 400.

Upon receiving the charge data, as well as the accounts settlement request, the credit transaction process server 400 employs the received charge data to forward a request to the bank account management server 500 for that part of the usage charge that should be paid by the service provider to be transferred from the account of the service provider to the account of the user. The accounts settlement request issued to the credit transaction process server 400 need not always be issued immediately after the charge process is completed, and may collectively be issued for a predetermined period of time (e.g., every month).

[2-2. Operation 2]

The case where the usage charge does not reach the value limit is explained above. An explanation is provided below for a case where the usage charge reaches the value limit.

When the charge bundle compatible device 300 receives the contents, the contents are printed by the printing apparatus 80. And when the printing is performed by receiving the contents distribution service, the usage status detection process is performed to detect the amount of expendable supplies consumption, the volume of communication, and the amount of electricity consumed. Then, the charge calculation process is performed to calculate the usage charge based on the charge correlation data and the amount of expendable supplies consumption, the volume of communication, and the amount of electricity consumed that are detected. When the usage charge reaches the value limit, the bundle deletion process at steps S650 to S656 is performed to transmit the value limit exceeding notification to the charge bundle management server 200, and to delete the charge bundle. As a result, the usage status detection process, the charge calculation process, the charge notification process, and the bundle deletion process are terminated.

Upon receiving the value limit exceeding notification, at steps S360 to S368 the charge bundle management server 200 employs this value limit exceeding notification to specify a service provision source and a service provision destination, charges the service provider the value limit, and transmits the charge bundle termination notification to the service provision terminal 100. When the charge process is completed in this manner, the charge data, together with the accounts settlement request, are transmitted to the credit transaction process server 400.

[2-3. Operation 3]

In order to interact with the charge bundle to receive the contents distribution service, it is preferable that the user of the charge bundle compatible device 300 be registered in advance with the charge bundle management server 200. Of course, since the charge bundle includes a function to notify the user of the charge data, the user registration need not always be performed.

To perform the user registration, the user of the charge bundle compatible device 300 employs one of the terminals on the Internet 199 and transmits, to the bundle management server 200, not only a user registration request but also user data that include, for example, a user name, a password, a name, an address, a gender, an age, an occupation, a membership group, a service permitted to be provided, and the address of the charge bundle compatible device 300.

Upon receiving the user registration request, at steps S200 to S204 the charge bundle management server 200 receives user data and registers the received user data in the user data registration DB 60. The registration for the service provider data is also performed in the same manner.

[2-4. Operation 4]

The changing or updating of the user data or the service provider data, or the disclosure of the user data or the charge bundle compatible device 300 can also be performed.

To perform these processes, one of the terminals on the Internet 199 transmits a management request to the charge bundle management server 200.

Upon receiving of the management request, at steps S250 to S256 the charge bundle management server 200 examines the contents of the request. When the management request is appropriate, the user authentication process is performed for a user or a service provider that is the management request source. When as a result, the user authentication is obtained, at steps S258 and S260 a process corresponding to the contents of the management request is performed. That is, when the management request is related to the changing or the updating of the user data or the service provider data, the user data or the service provider data are changed or updated. When the management request is related to the disclosure of the user data or the charge bundle compatible device 300, the user data or the charge bundle compatible device 300 is disclosed to the requesting source.

[3. Effects Obtained by the Exemplary Embodiment]

[3-1. Effect 1]

As is described above, the charge bundle in this embodiment includes: the usage status detection process, to detect the usage state of the charge bundle compatible device 300; the charge calculation process, to calculate the usage charge based on the usage status detected during the usage status detection process; and the charge notification process, to notify the charge bundle management server 200 of the usage charge obtained during the charge calculation process. The charge bundle management server 200 generates a charge bundle in accordance with a request received from the service provision terminal 100, and transmits the generated charge bundle to the charge bundle compatible device 300. Further, the charge bundle management server 200 performs the charge process to demand the service provider for the usage charge that is notified during the charge notification process. When the charge bundle compatible device 300 receives the charge bundle, it constitutes the usage status detection process, the charge calculation process, and the charge notification process based on the received charge bundle.

As a result, the charge that should be paid by the user of the charge bundle compatible device 300 for the contents distribution service can be reduced. Further, since the charge bundle compatible device 300 need only develop the charge bundle, the user registration is not always required for the charge bundle management server 200, and the contents distribution service can be provided for a person other than a registered person, while the charge is reduced. Therefore, the contents distribution service can be provided more smoothly than in the related art case.

[3-2. Effect 2]

Further, in accordance with this exemplary embodiment, consonant with the request from the service provision terminal 100 the charge bundle management server 200 generates a charge bundle corresponding to the contents distribution service provided by the service provision terminal 100.

As a result, since the charge bundle can be generated for each service, various services can be coped with.

[3-3. Effect 3]

In addition, according to this exemplary embodiment, during the usage status detection process the amount of expendable supplies consumed by the charge bundle compatible device 300 for the provision of the contents distribution service, and the volume of the communication and the amount of electricity consumed at the charge bundle compatible device 300 to provide for the contents distribution service are detected as the usage status.

As a result, the charge that should be paid by the user of the charge bundle compatible device 300 for the contents distribution service can be reduced, as is the amount of expendable supplies consumed by the charge bundle compatible device 300 for the provision of the contents distribution service, and the volume of the communication and the amount of electricity consumed at the charge bundle compatible device 300 for the provision of the contents distribution service.

[3-4. Effect 4]

Furthermore, according to the exemplary embodiment, the charge bundle management server 200 sets the value limit for the usage charge, in the notification prepared by the charge notification process, to charge the service provider. Within this set value limit, the usage charge included in notification prepared by the charge notification process is charged to the service provider.

With this configuration, since the value limit can be set for the charge for the service provider, the probability whereat an excessive payment or an unexpected payment will be requested of the service provider can be reduced.

[3-5. Effect 5]

Further, according to the exemplary embodiment, the charge bundle includes the value limit data indicating the value limit and the bundle deletion process to delete the charge bundle. In the bundle deletion process, the charge bundle is deleted when the usage charge obtained in the charge calculation process reaches a value limit indicated in the value limit data included in the charge bundle.

As is described above, since the charge bundle is deleted when the usage charge reaches the value limit, the probability whereat an excessive payment or an unexpected payment will be requested of the service provider can be further reduced.

[3-6. Effect 6]

In this exemplary embodiment, the credit transaction process server 400 that performs a transaction process is connected to enable communication. This credit transaction process server 400 is connected across the Internet 199 to the bank account management server 500 to manage the account of the service provider, and the bank account management server 500 to manage the account of the user of the charge bundle compatible device 300. Based on the charge data from the charge bundle management server 200, the bank account management server 500 is requested to provide for part of a usage charge that should be paid by the service provider to be transferred from the account of the service provider to the account of the user.

As a result, the transaction can be easily performed.

[3-7. Effect 7]

In this exemplary embodiment, an access right to permit an access only for a specific service or only by a specific service provider can be set for the user data.

As a result, the probability whereat an undesired service for the user is provided for the charge bundle compatible device 300 can be reduced.

[4. Correlation with Claims]

In this exemplary embodiment, the contents distribution service corresponds to a service according to any one of the first, third to fifth, eighth, fourteenth, sixteenth, eighteenth, twentieth, and twenty-second aspects of the invention. The service provision terminal 100 corresponds to a service provision terminal according to any one of the first, third to fifth, fourteenth, sixteenth, twentieth, and twenty-second aspects of the invention. The charge bundle management server 200 corresponds to the bundle management terminal according to any one of the third, sixth, fourteenth, sixteenth, eighteenth, twentieth, and twenty-second aspects of the invention. The charge bundle compatible device 300 corresponds to a service reception terminal according to any one of the first, third, fifth, fourteenth, sixteenth, eighteenth, twentieth, and twenty-second aspects of the invention. The credit transaction process server 400 corresponds to a transaction process terminal according to the eighth aspect of the invention, and the bank account management server 500 corresponds to the first account management terminal according to the eighth aspect of the invention or to the second account management terminal according to the eighth aspect of the invention.

Moreover, in this exemplary embodiment, the charge bundle corresponds to a bundle according to any one of the first, third, fourth, seventh, fourteenth, sixteenth, eighteenth, twentieth, and twenty-second aspects of the invention. The usage status detection process and the charge calculation process correspond to the expenses calculation device according to the first aspect of the invention. The usage status detection process corresponds to the usage status detection device according to one of the third, fifth, fourteenth, sixteenth, eighteenth, twentieth, and twenty-second aspects of the invention. Further, the charge calculation process corresponds to the charge calculation device according to any one of the third, seventh, fourteenth, sixteenth, eighteenth, twentieth, and twenty-second aspects of the invention. The charge notification process corresponds to the charge notification device according to any one of the third, sixth, fourteenth, sixteenth, eighteenth, twentieth, and twenty-second aspects of the invention. And the bundle deletion process corresponds to the bundle deletion device according to the seventh aspect of the invention.

Furthermore, in the above exemplary embodiment, step S306 corresponds to the value limit setting device according to the sixth or seventh aspect of the invention. Step S308 corresponds to the bundle generation device according to the third, fourth, fourteenth or sixteenth aspect of the invention, or the bundle generation step according to the twentieth or twenty-second aspect of the invention. Step S310 corresponds to the bundle transmission device according to the third, fourteenth or sixteenth aspect of the invention, or the bundle transmission step for the twentieth aspect of the invention. Steps S356 and S366 correspond to the expenses distribution device according to the first aspect of the invention, the charge process device according to the third, eighth, fourteenth or sixteenth aspect of the invention, or the charge process step according to the twentieth aspect of the invention. Steps S402 to S408 correspond to the steps according to the twentieth aspect of the invention.

[5. Another Exemplary Embodiment]

5-1. EXAMPLE 1

Figure 17:
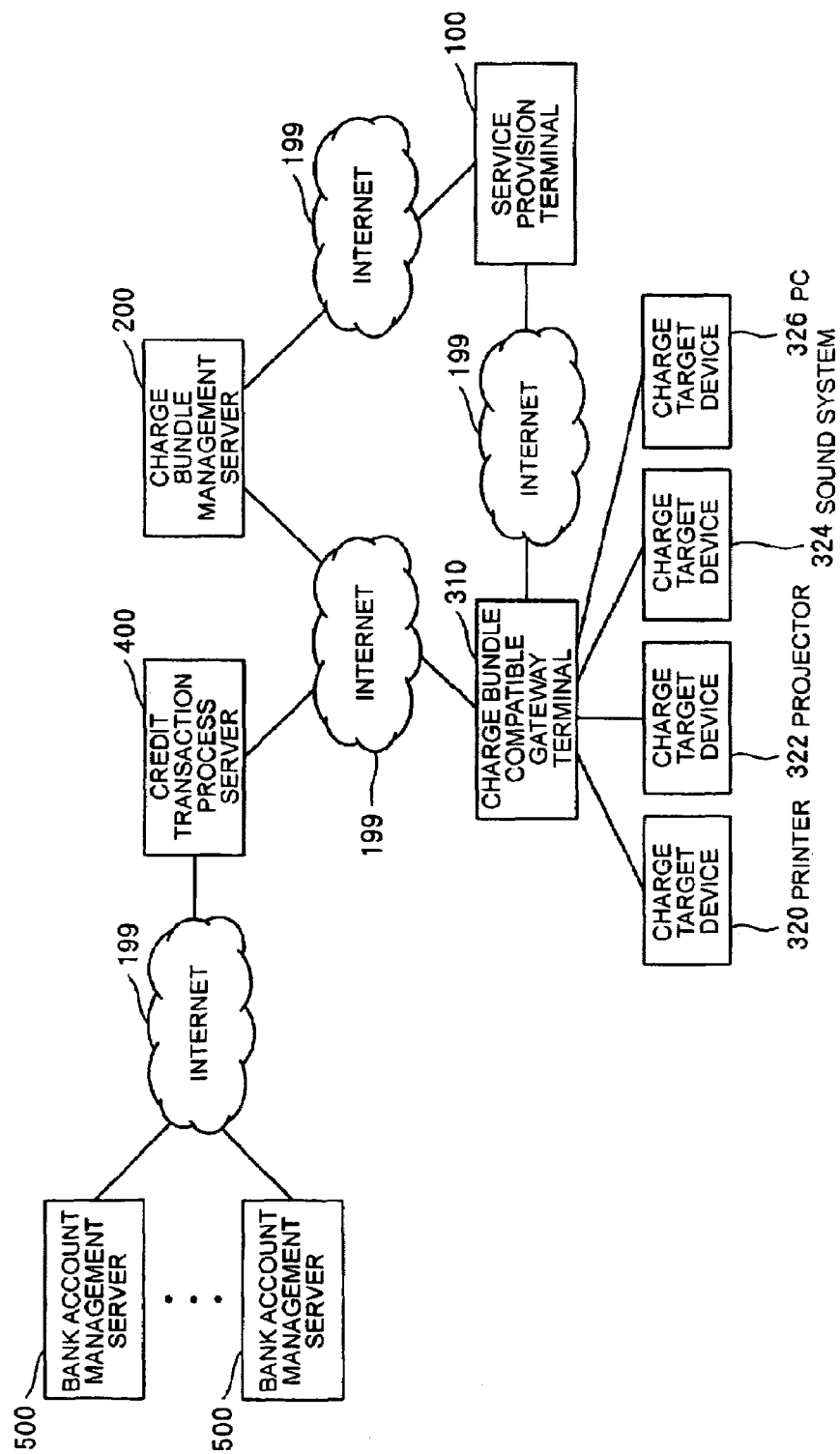
FIG. 17 is schematic of another network system for which the present invention can be applied.

In the configuration of the above exemplary embodiment, the service provision terminal 100 provides a contents distribution service in an environment where the service provision terminal 100 can communicate directly with the charge bundle compatible device 300. However, in addition to this configuration, as is shown in FIG. 17, a service provision terminal 100 may provide a contents distribution service in an environment where the service provision terminal 100 can communicate indirectly with a charge bundle compatible device 300 via a charge bundle compatible gateway terminal 310. In this case, the charge bundle is applied for the charge bundle compatible gateway terminal 310. FIG. 17 is a schematic showing the configuration of another network system to which the present invention is applied.

In FIG. 17, the service provision terminal 100, the charge bundle management server 200, the charge bundle compatible gateway terminal 310, a credit transaction process server 400, and multiple bank account management servers 500 are connected to the Internet 199.

A charge target device 320, such as a printer, a charge target device 322 such as a projector, a charge target device 324, such as a sound system, and a charge target device 326, such as a PC are connected to the charge bundle compatible gateway terminal 310.

In this case, as in the above exemplary embodiment, the contents distribution service is provided for the charge target device 320; a video distribution service to distribute video is provided for the charge target device 322; an audio distribution service to distribute sound is provided for the charge target device 324; and an email and other data distribution service to distribute data by email or by a specific application is provided for the charge target device 326. These services can be provided in the same manner as in the above exemplary embodiment.

In this case, the contents distribution service, the video distribution service, the audio distribution service, and the email and other data distribution service correspond to a service according to any one of the second, tenth to thirteenth, fifteenth, seventeenth, nineteenth, twenty-first, and twenty-third aspects of the invention. The service provision terminal 100 corresponds to a service provision terminal according to any one the second, tenth to thirteenth, fifteenth, seventeenth, twenty-first, and twenty-third aspects of the invention. The charge bundle management server 200 corresponds to a bundle management terminal according to any one of the thirteenth, fifteenth, seventeenth, nineteenth, twenty-first, and twenty-third aspects of the invention. The charge bundle compatible gateway terminal 310 corresponds to a gateway terminal according to any one of the second, thirteenth, fifteenth, seventeenth, nineteenth, and twenty-first aspects of the invention.

The charge target devices 320 to 326 correspond to a service reception terminal according to any one of the second, tenth to thirteenth, fifteenth, seventeenth, nineteenth, twenty-first, and twenty-third aspects of the invention. The charge bundle corresponds to a bundle according to any one of the second, thirteenth, fifteenth, seventeenth, nineteenth, twenty-first, and twenty-third aspects of the invention. The usage status detection process and the charge calculation process correspond to the expenses calculation device according to the second aspect of the invention. The usage status detection process corresponds to the usage status detection device according to any one of the thirteenth, fifteenth, seventeenth, nineteenth, twenty-first, and twenty-third aspects of the invention. The charge calculation process corresponds to the charge calculation device according to any one of the thirteenth, fifteenth, seventeenth, nineteenth, twenty-first, and twenty-third aspects of the invention. And the charge notification process corresponds to the charge notification device according to any one of the thirteenth, fifteenth, seventeenth, nineteenth, twenty-first, and twenty-third aspects of the invention.

Further, step S308 corresponds to the bundle generation device according to the thirteenth, fifteenth or seventeenth aspect of the invention, or the bundle generation step according to the twenty-first or twenty-third aspect of the invention. Step S310 corresponds to the bundle transmission device according to the thirteenth, fifteenth or seventeenth aspect of the invention, or the bundle transmission step according to the twenty-first aspect of the invention. Steps S356 and S366 correspond to the expenses distribution device according to the second aspect of the invention, the charge process device according to the thirteenth, fifteenth or seventeenth aspect of the invention, or the charge process step according to the twenty-first aspect of the invention. Steps S402 to S408 correspond to the steps according to the twenty-first aspect of the invention.

5-2. EXAMPLE 2

Figure 18:
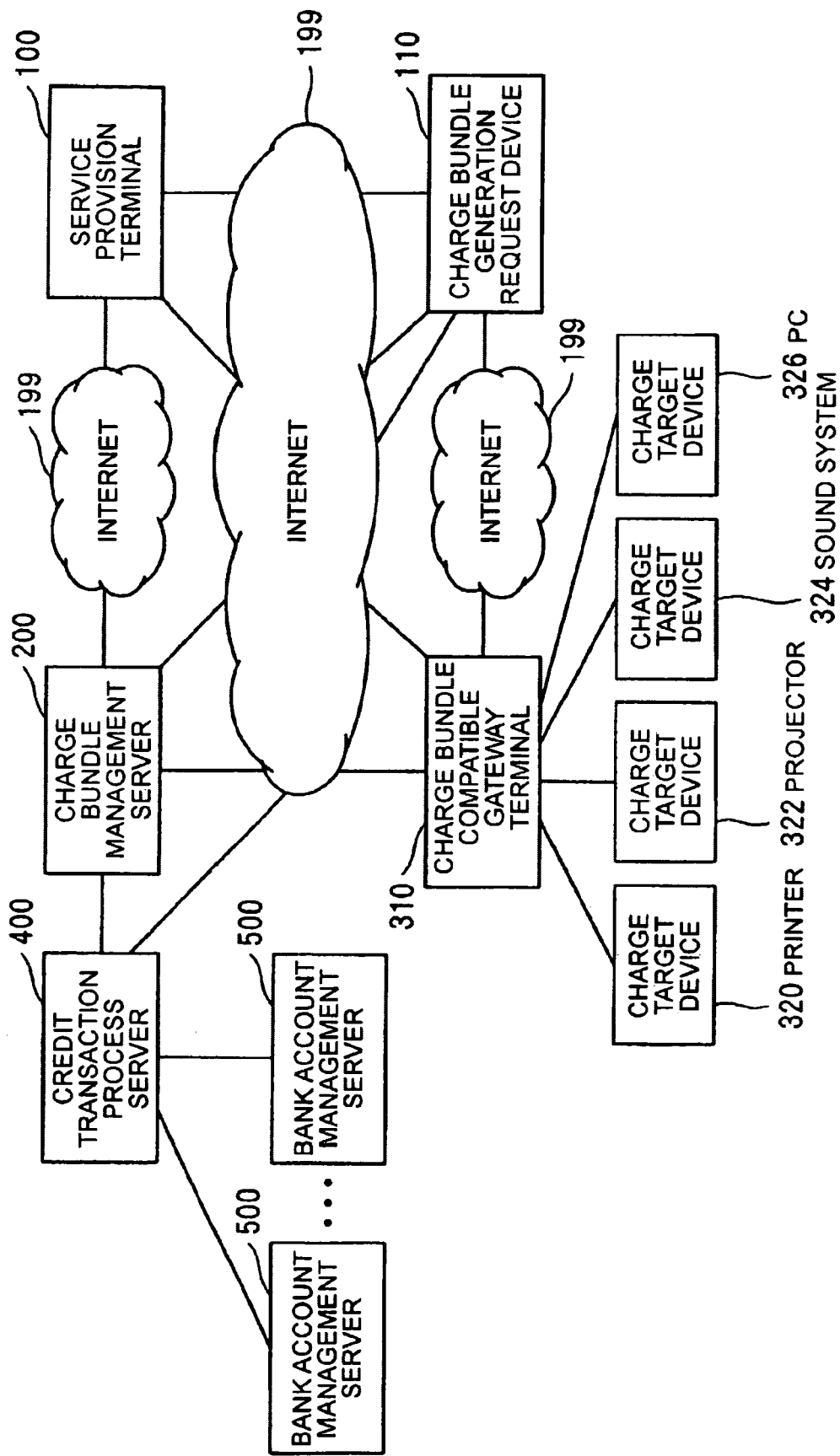
FIG. 18 is a schematic of an additional network system for which the present invention can be applied.

In the configuration according to the above exemplary embodiment, the service provision terminal 100 provides the contents distribution service in an environment where the service provision terminal 100 can communicate directly with the charge bundle compatible device 300. In addition to the configuration, as is shown in FIG. 18, a service provision terminal 100 may provide a contents distribution service in an environment wherein the service provision terminal 100 can indirectly communicate with a charge bundle compatible device 300 across a charge bundle compatible gateway terminal 310. In this case, the charge bundle is applied for the charge bundle compatible gateway terminal 310. FIG. 18 is a schematic showing the configuration of an additional network system to which the present invention is applied.

In FIG. 18, the service provision terminal 100, a charge bundle generation requesting device 110 to issue a charge bundle generation request to a charge bundle management server 200, the charge bundle management server 200, the charge bundle compatible gateway terminal 310, a credit transaction process server 400, and multiple bank account management servers 500 are connected to the Internet 199.

A charge target device 320 such as a printer, a charge target device 322 such as a projector, a charge target device 324, such as a sound system, and a charge target device 326, such as a PC are connected to the charge bundle compatible gateway terminal 310.

A difference from the configuration in FIG. 17 is that the charge bundle generation requesting device 110 is provided additionally. In the configuration in FIG. 18, the charge bundle generation requesting device 110 issues a charge bundle generation request, the charge bundle is applied for the charge bundle compatible gateway terminal 310, and the service provision terminal 100 provides a service for the charge target devices 320 to 326.

5-3. EXAMPLE 3

Furthermore, according to the configuration of the above exemplary embodiment, the contents distribution service is provided through the Internet 199. In addition to this configuration, a facsimile receiver connected via a phone line may be provided as the charge bundle compatible device 300, and a fax data distribution service for distributing contents by fax via a phone line may be provided.

Generally, the fax receiver is charged for fax paper and printing ink. When with the conventional configuration a large amount of fax data are received, the economic expenses on the fax receiver are increased. Therefore, when a large amount of undesired fax data is received, the economic expenses and psychological load are increased.

Thus, when a fax sender transmits in advance a charge bundle that pays the economic expenses that arise for all the fax data distribution services, the economic expenses imposed on the fax receiver can be eliminated.

Therefore, since the charge owed by the user of the charge bundle compatible device 300 for the fax data distribution service can be reduced, the fax data distribution service can be provided comparatively smoothly.

In this case, the service provision terminal 100 corresponds to a service provision terminal according to the ninth aspect of the invention, and the charge bundle compatible device 300 corresponds to the service reception terminal according to the ninth aspect of the invention.

5-4. EXAMPLE 4

In the above exemplary embodiment, when the usage charge reaches the value limit, the charge bundle is deleted. At this time, if the contents distribution service is being provided, the service provision may be halted at the same time as the charge bundle is deleted.

5-5. EXAMPLE 5

In the above exemplary embodiment, the process in the flowchart shown in FIG. 3 has been explained by using a case where a control program stored in advance in the ROM 32 is executed. The process is not limited to this, and the program for these procedures may be loaded into the RAM 34 from a storage medium and executed.

Furthermore, in this exemplary embodiment, the flowcharts in FIGS. 5, 6, 7, and 9 have been explained by using a case where the control program stored in advance in the ROM 52 is executed. The process is not limited to this, and the program for these procedures may be loaded into the RAM 54 from a storage medium and executed.

Further, in this exemplary embodiment, the flowcharts in FIGS. 11 to 16 have been explained by using a case where the control program stored in advance in the ROM 72 is executed. The process is not limited to this, and the program for these procedures may be loaded into the RAM 74 from a storage medium and executed.

The storage medium is a semiconductor storage medium, such as a RAM or ROM, a magnetic storage medium such as an FD or an HD, a storage medium of optical reading type, such as a CD, a CDV, an LD or a DVD, or a storage medium of a magnetic storing/optical reading type, such as an MO. Regardless of the electronic, magnetic, optical reading method, any type of computer-readable storage medium is included.

5-6. EXAMPLE 6

In addition, in the above exemplary embodiment, an explanation has been given for a case wherein the service provision support system, the bundle management terminal, the terminal program, the bundle data structure, the service provision support method, and the bundle generation method according to the invention are applied for the network system using the Internet 199. However, the network system is not limited to this, and the present invention can be applied for a so-called intranet to perform communication using the same system as is used for the Internet 199. Of course, the present invention can also be applied for an ordinary network other than a network that performs communication using the same system as is used for the Internet 199.

5-7. EXAMPLE 7

Moreover, in the exemplary embodiment, the service provision support system, the bundle management terminal, the terminal program, the bundle data structure, the service provision support method, and the bundle generation method of the invention have been employed for a case where, as is shown in FIG. 1, the service provision terminal 100 provides the contents distribution service, to distribute contents, for the charge bundle compatible device 300 across the Internet 199. However, in addition to this case, the present invention can be applied for another case without departing from the subject of the invention. For example, the following examples can be assumed.

First, a video advertisement and television shopping service can be provided for a user who has a projector consonant with the taste of the user. For example, when the user has an outdoor hobby, the advertisement and television shopping service for outdoor goods is provided through the projector. The communication fee, the electricity fee for video distribution, etc., are managed by the charge bundle, and all these expenses are charged to the advertisement distributor.

Second, a movie preview distribution service for distributing the preview of a movie is provided for a user who has a projector. When the user likes the preview, the advertisement for a movie show implements a home theater.

Third, a music distribution service using streaming is provided for a user who has a sound system. When the user likes the received music, he or she can purchase the music. The communication fee, the electricity fee, etc., required for the music distribution are managed by the charge bundle, and all these expenses are charged to the music distributor.

Fourth, sample food is provided for a user who owns a stove or an microwave. The fee for a recipe software application necessary for automatic cooking to cook the food, the fee for the electricity and water, etc., are managed by the charge bundle, and all these expenses are charged to the food company that provides the sample food.

[Advantages of the Invention]

As is described above, according to the service provision support system according to the first and second aspects of the present invention, the economic expenses that arise on the service reception terminal side for the provision of a service can be reduced. Further, since the service reception terminal need only develop the bundle, the registration of a service recipient need not always be performed by the electronic transaction process server, etc., and a service can be provided for a person other than a registered person, while the economic expenses are reduced. Therefore, as one effect, the service can be provided more smoothly than in the conventional case.

Further, according to the service provision support system consonant with one of the third to thirteenth aspects of the present invention, a charge paid by the service reception terminal for the provision of the service can be reduced. Since the service reception terminal need only develop the bundle, the registration of a service recipient need not always be performed by the electronic transaction process server, etc., the service can be provided for a person other than a registered person, while the charge is reduced. Therefore, as one effect, the service can be provided more smoothly than in the related art case.

Furthermore, in accordance with the service provision support system consonant with the fourth aspect of the present invention, since a bundle can be generated for each service, as another effect, various services can be coped with.

According to the service provision support system according to the fifth aspect of the present invention, as another effect, the charge paid by the service reception terminal for the provision of the service can be reduced as regards the number of times or the period where the service provision terminal employed the service reception terminal to provide a service, the amount of expendable supplies used by the service reception terminal to receive the service, or the volume of the communications or the amount of electricity consumed at the service reception terminal to receive of the service.

According to the service provision support system consonant with sixth or seventh aspects of the present invention, since the value limit can be set for a charge to the service provider, as another effect, the probability whereat an excessive payment or an unexpected payment is requested of the service provider can be reduced.

In addition, according to the service provision support system according to the seventh aspect of the invention, since a bundle is deleted when the charge reaches the value limit, as another effect, the probability whereat an excessive payment or an unexpected payment is requested of the service provider can be further reduced.

According to the service provision support system according to the eighth aspect of the invention, as another effect, the transaction can be easily performed.

According to the service provision support system consonant with the ninth aspect of the invention, since the charge paid by the service reception terminal for the fax data distribution service can be reduced, as another effect, the fax data distribution service can be provided comparatively smoothly.

According to the service provision support system consonant with the tenth aspect of the invention, since the charge paid by the service reception terminal for the email and other data distribution services can be provided, as another effect, the email and other data distribution services can be performed comparatively smoothly.

According to the service provision support system consonant with the eleventh aspect of the invention, since the charge paid by the service reception terminal for the video distribution service can be reduced, as another effect, the video distribution service can be provided comparatively smoothly.

According to the service provision support system consonant with the twelfth aspect of the invention, since the charge paid by the service reception terminal for the audio distribution service can be reduced, as another effect, the audio distribution service can be performed comparatively smoothly.

According to the bundle management terminal consonant with the fourteenth aspect of the invention, the same effects are provided as are obtained by the service provision support system according to the third aspect.

According to the bundle management terminal consonant with the fifteenth aspect of the present invention, the same effects are provided as are obtained by the service provision support system according to the thirteenth aspect.

According to the terminal program consonant with the sixteenth aspect of the invention, the same effects are provided as are obtained by the bundle management terminal according to the fourteenth aspect.

According to the bundle management terminal consonant with the seventeenth aspect of the invention, the same effects are provided as are obtained by the bundle management terminal according to the fifteenth aspect.

According to the bundle data structure consonant with the eighteenth aspect of the present invention, the same effects are provided as are obtained by the service provision support system according to the third aspect.

According to the bundle data structure consonant with the nineteenth aspect of the present invention, the same effects are provided as are obtained by the service provision support system according to the thirteenth aspect.

According to the service provision support method consonant with the twentieth aspect of the invention, the same effects are provided as are obtained by the service provision support system according to the third aspect.

According to the service provision support method consonant with the twenty-first aspect of the present invention, the same effects are provided as are obtained by the service provision support system according to the thirteenth aspect.

According to the bundle generation method consonant with the twenty-second aspect of the invention, the same effects are provided as are obtained by the bundle data structure according to the eighteenth aspect.

According to the bundle generation method consonant with the twenty-third aspect of the invention, the same effects are provided as are obtained by the bundle data structure according to the nineteenth aspect.

What is claimed is:

1. A service provision support system, comprising:
a service provision terminal through which a service is provided, and
a service reception terminal which is a destination for the service that is provided,
the service provision terminal and the service reception terminal capable of communicating with each other, and distributing to a service provider economic expenses arising at said service reception terminal due to the provision of said service, the service provision terminal and the service reception terminal each having a storage medium to store instructions for the service provision support system, the instructions including expenses calculation instructions to calculate the economic expenses arising at said service reception terminal due to the provision of said service; and expenses distribution instructions to distribute, to said service provider, a part or all of said economic expenses calculated through said expenses calculation instructions; wherein on an occasion to provide said service, said service provision terminal transmitting, to said service reception terminal, a bundle that includes said expenses calculation instructions; and upon receiving said bundle, said service reception terminal executing said expenses calculation instructions based on said received bundle.

2. A service provision support system, comprising:

a service reception terminal, which is a service provision designation;

a service provision terminal, which is a service provision source; and a gateway terminal that, to enable communication, connects the service reception terminal to the service provision terminal so said terminals can communicate with each other, and which distributes to a service provider economic expenses arising at said service reception terminal due to the provision of a service, the service reception terminal and the service provision terminal each having a storage medium to store instructions for the service provision support system, the instructions including expenses calculation instructions to calculate said economic expenses arising at said service reception terminal due to the provision of said service; and expenses distribution instructions to distribute, to said service provider, a part or all of said economic expenses calculated through said expenses calculation instructions; wherein on an occasion to provide said service, said service provision terminal transmitting said gateway terminal a bundle including said expenses calculation instructions; and upon receiving said bundle, said gateway terminal executing said expenses calculation instructions based on said received bundle.

3. A service provision support system, comprising:

a service provision terminal, which is a service provision source;

a service reception terminal, which is a service provision destination; and a bundle management terminal to manage a bundle and that is connected to the service provision terminal and the service reception terminal so as to enable communication;

said service provision terminal, on an occasion to provide a service, utilizing said bundle for said service reception terminal; the service provision terminal, the service reception terminal and the bundle management terminal each having a storage medium to store instructions, and a service provider being demanded for a charge that arises at said service reception terminal due to the provision of said service;

said bundle including:

usage status detection instructions to detect the usage status of said service reception terminal;

charge calculation instructions to employ said usage status detected by said usage status detection instructions to calculate a charge that arises at said service reception terminal due to the provision of said service; and charge notification instructions to transmit to said bundle management terminal a notification of said charge obtained through said charge calculation instructions;

said bundle management terminal including:

bundle transmission instructions to transmit, to said service reception terminal, said bundle; and charge processing instructions to perform charge processing to charge a part or all of said charge contained in said notification provided by said charge notification instructions to said service provider; and said service reception terminal, upon receiving said bundle, executing said usage status detection instructions, said charge calculation instructions, and said charge notification instructions based on said received bundle.

4. The service provision support system according to claim 3, said usage status detection instructions detecting, as said usage status, a number of times, or a period, of at least one of said service provision terminal being employed by said service reception terminal to provide said service, an amount of expendable supplies consumed by said service reception terminal because of the provision of said service, an amount of communication occurring at, and an amount of current used by said service reception terminal because of the provision of said service.

5. The service provision support system according to claim 3, said bundle management terminal including instructions to set a value limit when said service provider is charged for a part or all of said charge included in said notification submitted by said charge notification instructions; and said charge processing charging a part or all of said charge contained in said notification submitted by said charge notification instructions to said service provider, while employing said value limit set by said value limit setting device as a limit.

6. The service provision support system according to claim 5, said bundle further including value limit data, indicating said value limit set by said value limit setting instructions, and bundle deletion instructions to delete said bundle; and when said charge calculated through said charge calculation instructions reaches said value limit designated by said value limit data included in said bundle, said bundle deletion instructions delete said bundle.

7. The service provision support system according to claim 3, further including a transaction processing terminal that performs a transaction based on the results obtained through said charge processing instructions and that is connected to enable communication; said transaction processing terminal being connected to a first account management terminal to manage the account of said service provider and to a second account management terminal to manage the account of a service recipient, enabling the terminals to communicate with each other; and said transaction processing terminal issuing a request to said first account management terminal and said second account management terminal that money, equivalent in value to said charge that has arisen at said service reception terminal due to the provision of said service, and that should be paid by said service provider, be moved from said account of said service provider to said account of said service recipient.

8. The service provision support system according to claim 3, said service provision terminal providing, for said service reception terminal, a fax data distribution service whereby data are distributed by fax; and said service reception terminal having a fax reception function that can receive data from said service provision terminal by fax.

9. The service provision support system according to claim 3, said service provision terminal providing, for said service reception terminal, email and other data distribution services to distribute data by email or by the employment of a specific application; and said service reception terminal having email and another data reception function that can receive data from said service provision terminal by email or through said specific application.

10. The service provision support system according to claim 3, said service provision terminal providing a video distribution service to distribute video data to said service reception terminal; and said service reception terminal having a video playback function that can play back said video data received from said service provision terminal.

11. The service provision support system according to claim 3, said service provision terminal providing an audio distribution service to distribute audio data to said service reception terminal; and said service reception terminal having an audio playback function that can play back said audio data received from said service provision terminal.

12. A service provision support system, comprising:
a service reception terminal, which is a service provision destination to enable communication;
a service provision terminal, which is a service provision source;
a bundle management terminal, which is provided for management of a bundle; and
a gateway terminal that connects the service reception terminal, the service provision terminal and the bundle management terminal together so that they can communicate with each other;
said service provision terminal utilizing said bundle to said gateway terminal on an occasion to provide a service, the service provision terminal, the service reception terminal and the bundle management terminal each having a storage medium to store instructions; and
a service provider being demanded for a charge that arises at said service reception terminal due to the provision of said service;
said bundle including:
usage status detection instructions to detect a usage status of said service reception terminal;
charge calculation instructions to employ said usage status detected by said usage status detection instructions to calculate a charge that arises at said service reception terminal due to the provision of said service; and
charge notification instructions to transmit to said bundle management terminal a notification of said charge obtained by said charge calculation instructions;
said bundle management terminal including:
bundle transmission instructions to transmit, to said gateway terminal, said bundle; and
charge processing instructions to perform charge processing to charge a part or all of said charge contained in said notification provided through said charge notification instructions to said service provider; and
said gateway terminal, upon receiving said bundle, executes said usage status detection instructions, said charge calculation instructions, and said charge notification instructions based on said received bundle.

13. A service provision support method, for use with a service provision terminal, which is a service provision source, a service reception terminal, which is a service provision destination, and a bundle management terminal to manage a bundle that are connected together so as to enable communication, said service provision terminal, on the occasion to provide a service, utilizing said bundle for said service reception terminal, and a service provider being demanded for a charge that arises at said service reception terminal due to the provision of said service, the service provision terminal, the service reception terminal and the bundle management terminal each having a storage medium to store instructions, said bundle including: usage status detection instructions to detect the usage status of said service reception terminal, charge calculation instructions to employ said usage status detected by said usage status detection instructions to calculate a charge that arises at said service reception terminal due to the provision of said service, and charge notification instructions to transmit to said bundle management terminal a notification of said charge obtained by said charge calculation instructions, the method comprising:
transmitting to said service reception, terminal said bundle;
executing, upon receiving said bundle, said usage status detection instructions, said charge calculation instructions, and said charge notification instructions based on said received bundle; and
charging a part or all of said charge contained in said notification provided by said charge notification instructions to said service provider.

14. A service provision support method for use with a gateway terminal to connect a service reception terminal, which is a service provision destination to enable communication, a service provision terminal, which is a service provision source, and a bundle management terminal, which is provided for the management of a bundle, that are connected together so that they can communicate with each other, said service provision terminal utilizing said bundle to said gateway terminal on an occasion to provide a service, and a service provider is demanded for a charge that arises at said service reception terminal due to the provision of said service, the service provision terminal, the service reception terminal and the bundle management terminal each having a storage medium to store instructions, said bundle including: instructions to detect a usage status of said service reception terminal, instructions to employ said usage status detected by said usage status detection instructions to calculate a charge that arises at said service reception terminal due to the provision of said service, instructions to transmit to said bundle management terminal a notification of said charge obtained by said charge calculation instructions, the method comprising:
transmitting to said gateway terminal, said bundle generated;
executing, upon receiving said bundle, said usage status detection instructions, said charge calculation instructions, and said charge notification instructions based on said received bundle; and
charging a part or all of said charge contained in said notification provided by said charge notification instructions to said service provider.

* * * * *